United States Patent
Endo et al.

(10) Patent No.: US 6,983,885 B2
(45) Date of Patent: Jan. 10, 2006

(54) PRINT MEDIA PROCESSING APPARATUS AND CONTROL METHOD FOR THE SAME

(75) Inventors: Katsuyuki Endo, Matsumoto (JP); Sadao Murata, Okaya (JP); Hideki Furihata, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 10/234,794

(22) Filed: Sep. 4, 2002

(65) Prior Publication Data

US 2003/0047609 A1 Mar. 13, 2003

Related U.S. Application Data

(63) Continuation-in-part of application No. 10/172,076, filed on Jun. 14, 2002.

(30) Foreign Application Priority Data

| Jun. 22, 2001 | (JP) | ......................................... | 2001-190296 |
| Aug. 20, 2001 | (JP) | ......................................... | 2001-249557 |
| Sep. 7, 2001 | (JP) | ......................................... | 2001-272343 |
| Sep. 7, 2001 | (JP) | ......................................... | 2001-272344 |

(51) Int. Cl.
*G06K 7/08* (2006.01)

(52) U.S. Cl. ........................ 235/449; 235/439; 235/475
(58) Field of Classification Search ................ 235/454, 235/439, 449, 475–486, 493; 271/3.15, 3.17, 271/228, 250; 358/474, 448, 498
See application file for complete search history.

(56) References Cited

U.S. PATENT DOCUMENTS

| 5,646,388 | A | | 7/1997 | D'Entremont et al. |
| 5,661,571 | A | * | 8/1997 | Ijuin et al. .................. 358/471 |
| 5,757,431 | A | | 5/1998 | Bradley et al. |
| 5,771,071 | A | | 6/1998 | Bradley et al. |
| 5,789,727 | A | | 8/1998 | Teradaira et al. |
| 5,825,393 | A | | 10/1998 | Kocznar et al. |
| 5,886,334 | A | * | 3/1999 | D'Entremont et al. |
| 5,965,862 | A | | 10/1999 | Momose |
| 5,969,371 | A | * | 10/1999 | Andersen et al. ...... 250/559.15 |
| 6,043,906 | A | * | 3/2000 | Kikuchi ...................... 358/475 |
| 6,068,187 | A | | 5/2000 | Momose |
| 6,182,896 | B1 | | 2/2001 | Momose |
| 6,257,783 | B1 | | 7/2001 | Hanaoka et al. |
| 6,290,129 | B2 | | 9/2001 | Momose |
| 6,350,005 | B1 | | 2/2002 | Asai et al. |

FOREIGN PATENT DOCUMENTS

| EP | 0 895 868 A2 | * | 2/1999 |
| EP | 1 041 806 A2 | * | 10/2000 |
| EP | 1 080 927 A1 | * | 3/2001 |
| JP | 60-167460 | | 11/1985 |
| JP | 63-135271 | | 6/1988 |

(Continued)

*Primary Examiner*—Diane I. Lee
(74) *Attorney, Agent, or Firm*—MIchael T. Gabrik

(57) ABSTRACT

A print media processing apparatus having scanner feed rollers for holding and transporting print media against an image scanner appropriately controls the scanner feed roller position. The scanner feed rollers are opposite the image scanner, which is disposed along a vertical segment of a transportation path along which a check or form is transported. A roller retraction mechanism moves the scanner feed rollers between a closed position in which the rollers press against the scanning surface, and an open position in which the rollers are retracted therefrom. The scanner feed rollers retract to the open position a specific time after scanning ends. By delaying retraction of the rollers in this manner, the present invention solves the problem of a check or other print media, after having been processed and transported to the exit side of the rollers, from slipping down between the rollers and the image scanner into the vertical transportation path because the rollers opened as soon as scanning ends.

48 Claims, 23 Drawing Sheets

FOREIGN PATENT DOCUMENTS

| | | | |
|---|---|---|---|
| JP | 04-205488 | | 7/1992 |
| JP | 05-058514 | | 3/1993 |
| JP | 5-105298 | | 4/1993 |
| JP | 07-242044 | | 9/1995 |
| JP | 07-276720 | | 10/1995 |
| JP | 8-235309 | | 9/1996 |
| JP | 9-504891 | | 5/1997 |
| JP | 09-234924 | | 9/1997 |
| JP | 10-83438 | | 3/1998 |
| JP | 10-200673 | | 7/1998 |
| JP | 10-509538 | * | 9/1998 |
| JP | 11-7497 | | 1/1999 |
| JP | 11-027443 | | 1/1999 |
| JP | 11-075030 | | 3/1999 |
| JP | 11-129551 | * | 5/1999 |
| JP | 11-164086 | | 6/1999 |
| JP | 2000-015886 | | 1/2000 |
| JP | 2000-052603 | | 2/2000 |
| JP | 2000-255828 | | 9/2000 |
| JP | 2000-344428 | * | 12/2000 |
| JP | 2001-134702 | | 5/2001 |
| JP | 2001-268315 | | 9/2001 |
| WO | 95/11493 | * | 4/1995 |
| WO | 95/35217 | * | 12/1995 |
| WO | 96/10798 | * | 4/1996 |

* cited by examiner

PRINT MEDIA PROCESSING APPARATUS AND CONTROL METHOD FOR THE SAME

CONTINUING APPLICATION DATA

This application is a continuation-in-part of application Ser. No. 10/172,076, filed Jun. 14, 2002.

BACKGROUND OF THE INVENTION

1. Field of the Invention

The present invention relates to a print media processing apparatus having an image scanner for scanning a check or other print medium, and further relates to a control method for such a print media processing apparatus and a program of instructions for implementing the control method.

2. Description of the Related Art

Print media processing devices capable of performing multiple functions by combining an image scanner or other type of processing device with a printer have been proposed. One such device is a check processing apparatus having a print head, image scanner, and magnetic head. This check processing apparatus runs a printing process for printing essential information on a check, a scanning process to then capture an image of the printed check, and a data transmission process for sending the scanned image to a bank or other financial institution for payment as necessary, and is convenient because it enables on-line clearance of checks.

In order to assure sufficient quality in the scanned image with this type of check processing apparatus the check must be held against the scanning surface of the scanner to prevent the printed surface of the check from moving away from the scanning surface of the image scanner during the scanning operation. It is therefore preferable to transport the check while pressing it with a roller against the scanning surface. However, if the roller continues to press the check against the scanning surface when scanning is not in progress, the roller interferes with smooth check transportation.

To resolve this problem it is preferable to dispose a scanner feed roller opposite the scanning surface for transporting the check while pressing it against the scanning surface, and to use a mechanism for moving the scanner feed roller between a closed position in which the scanner feed roller is pressed to the scanning surface and an open position in which the scanner feed roller is retracted from the closed position.

In this case the scanner feed roller must be appropriately positioned at either the closed position or the open position. After a check is scanned, for example, it is transported by the scanner feed roller to the paper exit side. After the check is ejected from between the scanning surface and scanner feed roller, the check is held with the leading edge part of the check protruding from the exit opening so that the check can be pulled out by the user. However, if the scanner feed roller is retracted to the open position as soon as scanning is completed, the check that is waiting to be pulled out could fall back into the transportation path from between the scanning surface and the open scanner feed roller.

One way to avoid this problem is to hold the scanner feed roller in the closed position while waiting for the check to be removed. If this is done, however, the closed scanner feed roller will interfere with operations when a releasable cover, provided in the printer case for printer maintenance, is opened to, for example, remove a paper jam or replace the ink ribbon.

It is, of course, also possible to install a detector near the paper exit to detect when the check is removed from the paper exit and then move the scanner feed roller to the open position after the detector indicates that the check has been removed. This method is undesirable, however, because it requires a separate dedicated sensor which increases the number of parts in the apparatus and also its cost.

A further problem with this type of multiple function check processing apparatus is that, if the image scanner is located near the check exit opening, external light such as sunlight or internal light can impinge on the scanning surface through the exit opening. The problem here is that external light incident to the scanning surface causes a drop in the scanning quality of the image scanner.

For convenience in inserting and removing checks, some multiple function check processing apparatuses of this type have the insertion opening for inserting checks formed horizontally at the front part of the apparatus and the exit opening for removing the processed check formed in the top surface part of the apparatus housing. While this arrangement is convenient for inserting and removing checks, it also makes it easy for sunlight and light from other external sources to enter the inside of the apparatus through the exit opening, contact the scanning surface and thereby degrade the scanning quality.

These problems are not limited to such check processing apparatuses but can also occur in print media processing apparatuses having an image scanner for handling print media other than checks and in more general multifunction printers equipped with a scanner.

OBJECTS OF THE INVENTION

An object of the present invention is to solve the aforementioned problems.

Another object of this invention is to provide a print media processing apparatus capable of appropriately controlling the scanner feed roller position, and a control method for the scanner feed roller of the print media processing apparatus.

A further object of this invention is to provide a print media processing apparatus configured to prevent penetration of external light onto the scanning surface, without interfering with print media transportation.

SUMMARY OF THE INVENTION

To achieve these objects a print media processing apparatus according to one aspect of the present invention is provided. The apparatus comprises an insertion opening adapted to receive a print medium; an exit opening through which a print medium can be ejected; a transportation path adapted to transport a print medium from the insertion opening to the exit opening; an image scanner having a scanning surface and configured to scan an image on a print medium transported along the transportation path; a scanner feed roller configured to transport a print medium while pressing it against the scanning surface; an opening/closing mechanism configured to move the scanner feed roller between a closed position in which it is urged toward the scanning surface so as to press a print medium against the scanning surface and an open position in which the scanner feed roller is separated from the scanning surface; and a roller position controller configured to control driving of the opening/closing mechanism to control the scanner feed roller position.

In one arrangement, the roller position controller is further configured to move the scanner feed roller to the closed position when a print medium reaches a start scanning position on the transportation path and then, after a predetermined period of time elapses, the predetermined period of time starting from the time that scanning by the image scanner ends, to move the scanner feed roller to the open position.

Alternatively, the roller position controller can be configured to move the scanner feed roller to the closed position when a first command (e.g., an image scanning command) is received and a print medium reaches a start scanning position on the transportation path, then, after scanning by the image scanner ends, to hold the scanner feed roller in the closed position until receiving a second command, and to move the scanner feed roller to the open position upon receipt of the second command. The second command preferably includes one of the following commands: a successive image scanning command, a printing command for printing on the print medium by a print head, and a MICR command for reading magnetic data recorded on a print medium by a magnetic head.

To detect if the print medium reached the start scanning position, a detector is preferably disposed upstream of the image scanner in the transportation direction. A detection signal from the detector can then be used to inform the roller position controller when the print medium reached the scanning start position.

The roller position controller moves the scanner feed roller to the open position when a releasable or openable cover formed in an external case of the apparatus is opened. When thus configured the scanner feed rollers will not interfere with maintenance tasks conducted when the cover is open. In this case, a detector for detecting if the cover was opened is provided, and the open or closed state of the cover is detected based on a detection signal from the detector.

Further preferably, the roller position controller moves the scanner feed roller to the open position when a predetermined time, starting after scanning by the image scanner ends, elapses. By appropriately setting the time from the end of scanning to when the scanner feed roller is moved, the print medium can be prevented from slipping into the transportation path from between the open scanner feed rollers and the scanning surface. Preferably, a timer measures the predetermined time after scanning by the image scanner ends, and the timer is reset when the scanner feed roller moves to the open position.

If the image scanner and scanner feed roller are disposed in opposing positions with respect to the transportation path at a location below the exit opening, the print medium can drop easily into the transportation path. It is therefore particularly effective to thus not move the scanner feed roller as soon as scanning ends.

Further preferably, the roller position controller holds the scanner feed roller in the open position when the print medium is not scanned. It is therefore possible to prevent problems such as interference with smooth media transportation resulting from the transported print medium contacting the scanner feed roller in the closed position.

In addition to an image scanner the print media processing apparatus preferably also includes a magnetic head for reading magnetic data recorded on a print medium transported along the transportation path.

In a further typical configuration of a print media processing apparatus, a print head for printing to a print medium transported along the transportation path is also provided, in addition to the image scanner. In this case, there is also preferably a mode selector for alternatively selecting from at least three processing modes: a first processing mode for printing on, and scanning, the print medium, a second processing mode for only printing on the print medium, and a third processing mode for only scanning the print medium. Based on the processing mode selected, the roller position controller determines whether to scan the print medium and controls the position of the scanner feed roller accordingly.

The mode selector may include a manually operated mode switching button. The mode selector could also select the processing mode based on a mode selection command from an external device such as a higher level host computer.

Further preferably, the insertion opening enables inserting print media from a substantially horizontal direction, and the transportation path has a horizontal path contiguous with the insertion opening, a curved path contiguous with and curving upwardly from the horizontal path, and a vertical path contiguous with and extending upwardly from the curved path. The print head and image scanner are disposed in that order from the bottom side of the vertical path, and the exit opening is positioned at a top end of the vertical path.

According to another aspect of the invention, a control method for a print media processing apparatus is provided. The apparatus includes a transportation path adapted to transport a print medium inserted through an insertion opening to an exit opening, an image scanner configured to scan an image on a print medium transported along the transportation path, a scanner feed roller configured to transport a print medium, and an opening/closing mechanism configured to move the scanner feed roller between a closed position in which it is urged toward a scanner surface of the image scanner so as to press a print medium against the scanning surface and an open position in which the scanner feed roller is separated from the scanning surface. The steps of the control method include: a first standby step involving awaiting insertion of a print medium to the insertion opening with the scanner feed roller held in the open position; transporting the print medium from the insertion opening to a scanning position of the image scanner, when insertion of the print medium into the insertion opening is detected and a specific command is received; moving the scanner feed roller to the closed position after the print medium reaches the scanning position, transporting the print medium while pressing it against the scanning surface, and scanning an image printed on the print medium; and a second standby step involving awaiting insertion of a next print medium into the insertion opening with the scanner feed roller held in the closed position after scanning of the previous print medium ends.

Preferably, the scanner feed roller moves to the open position and the first standby step is assumed after a predetermined period of time elapses, the predetermined period of time starting when a previous scanning operation ends. In addition, when it is detected that an openable cover formed in an external case of the print media processing apparatus is opened during the second standby step, the scanner feed roller is moved to the open position.

If the print media processing apparatus has a print head for printing on print media, the control method further comprises transporting a print medium from the insertion opening to a printing position, when insertion of the print medium into the insertion opening is detected and a specific command is received; and printing on the print medium while the scanner feed roller is held in the open position.

If the print media processing apparatus has a magnetic head for reading magnetic data prerecorded on the print media, the control method further preferably comprises transporting a print medium from the insertion opening to a magnetic data reading position, when insertion of a print medium into the insertion opening is detected and a specific command is received; and reading the magnetic data while the scanner feed roller is held in the open position.

According to a further aspect of the invention, a print media processing apparatus is provided. The apparatus comprises an insertion opening adapted to receive a print medium; an exit opening through which a print medium can be ejected; a transportation path adapted to transport a print medium from the insertion opening to the exit opening; an image scanner configured to scan an image on a print medium transported along the transportation path; and a shield adapted to block external light from entering through the exit opening and impinging on a scanning position relative to the image scanner.

The shield of this configuration can block external light entering from the exit opening during scanning, and problems resulting from external light impinging on or around the scanning surface, such as a drop in image quality, can be prevented.

The shield preferably comprises an internal shield movable between an open position and a closed position in which the the internal shield blocks an ejection side of the transportation path between the scanning position and the exit opening.

Further preferably, the internal shield comprises a moving mechanism for moving the internal shield between the closed and open positions. By thus retracting the internal shield to the retracted position when not scanning, the internal shield is prevented from interfering with the transported print medium.

To enable smooth print medium transportation when the internal shield is in the closed position, the internal shield comprises a print medium guide surface having a contact surface for contacting the image scanner when the internal shield is in the closed position.

To hold the internal shield stably in the closed position, the internal shield further preferably has a first urging member for forcibly urging the internal shield toward the image scanner when the internal shield is in the closed position.

To likewise stably hold the internal shield in the retracted position, the internal shield further preferably has a second urging member for holding the internal shield in the retracted or open position.

These first and second urging members can be compactly achieved used a single torsion spring. In this case, a first end part of the torsion spring functions as the first urging member and a second end part of the torsion spring functions as the second urging member.

The shield in this aspect of the invention may comprise an external shield for blocking external light entering the exit opening. Preferably, the external shield is provided in addition to the internal shield. By thus blocking external light entering the exit opening, external light can be reliably prevented from contacting the scanning surface even if, for example, folds or wrinkles in the paper force the internal shield to move and thus create a gap through which external light could pass.

To more reliably block external light entering the exit opening, the external shield is preferably sized to enclose the exit opening as seen along the ejection direction of the print medium.

Furthermore, to prevent the external shield from interfering with ejection of print media ejected from the exit opening, the external shield preferably has a guide surface that is inclined or curved relative to the print medium ejection direction.

Furthermore, to even more reliably prevent external light incident at an angle to the exit opening from contacting the scanning surface, the external shield preferably extends from an open edge part of the exit opening on a side opposite the image scanner.

A further print media processing apparatus according to another aspect of the present invention includes an insertion opening adapted to receive a print medium; an exit opening through which a print medium can be ejected; a transportation path adapted to transport a print medium from the insertion opening to the exit opening; an image scanner configured to scan an image on a print medium transported along the transportation path, the image scanner having a scanning surface; a scanner feed roller configured to transport a print medium while pressing it against the scanning surface; an opening/closing mechanism configured to move the scanner feed roller between a closed position in which it is urged toward the scanning surface so to press a print medium against the scanning surface and an open position in which the scanner feed roller is separated from the scanning surface; and an internal shield movable between an open position and a closed position in which the internal shield blocks an ejection side of the transportation path between a scanning position and the exit opening, the internal shield moving between the closed position and the open position in conjunction with the scanner feed roller. With this configuration a special internal shield moving mechanism for moving the internal shield can be omitted, and the apparatus can be made small and compact.

Preferably, the opening/closing mechanism has an urging member to urge the scanner feed roller support shaft in the direction in which the scanner feed roller presses against the scanning surface of the image scanner, and a solenoid for sliding the support shaft against the urging force of the urging member to retract the scanner feed roller. The internal shield slides in conjunction with the scanner feed roller support shaft.

Further preferably, the print media processing apparatus also has a shield urging member for holding the internal shield in the closed position when the internal shield slides to the closed position, and for holding the internal shield in the retracted position when the internal shield slides to the retracted position.

Further preferably, the internal shield has a main shield part able to contact the scanning surface of the image scanner when in the closed position; a leg part projecting substantially perpendicularly from each end of the main shield part; a support structure formed in each leg part for rotatably supporting the scanner feed roller shaft; and an engaging leg part projecting substantially perpendicularly from the main shield part. The engaging leg part is urged by the shield urging member at a place on a side symmetrical to the main shield part with respect to the scanner feed roller shaft.

The shield urging member is preferably a torsion spring and the engaging leg part is positioned between the ends thereof.

A print media processing apparatus having an image scanner, front and back print heads, and a magnetic head as described above can be used as a check processing apparatus for processing checks having front and back printing areas and a magnetic recording area (magnetic ink character recording area).

DESCRIPTION OF THE PREFERRED EMBODIMENTS

A check processing apparatus is described below with reference to the accompanying figures as an example of a print media processing apparatus according to a preferred embodiment of the present invention.

Overall Configuration

Figure 1:
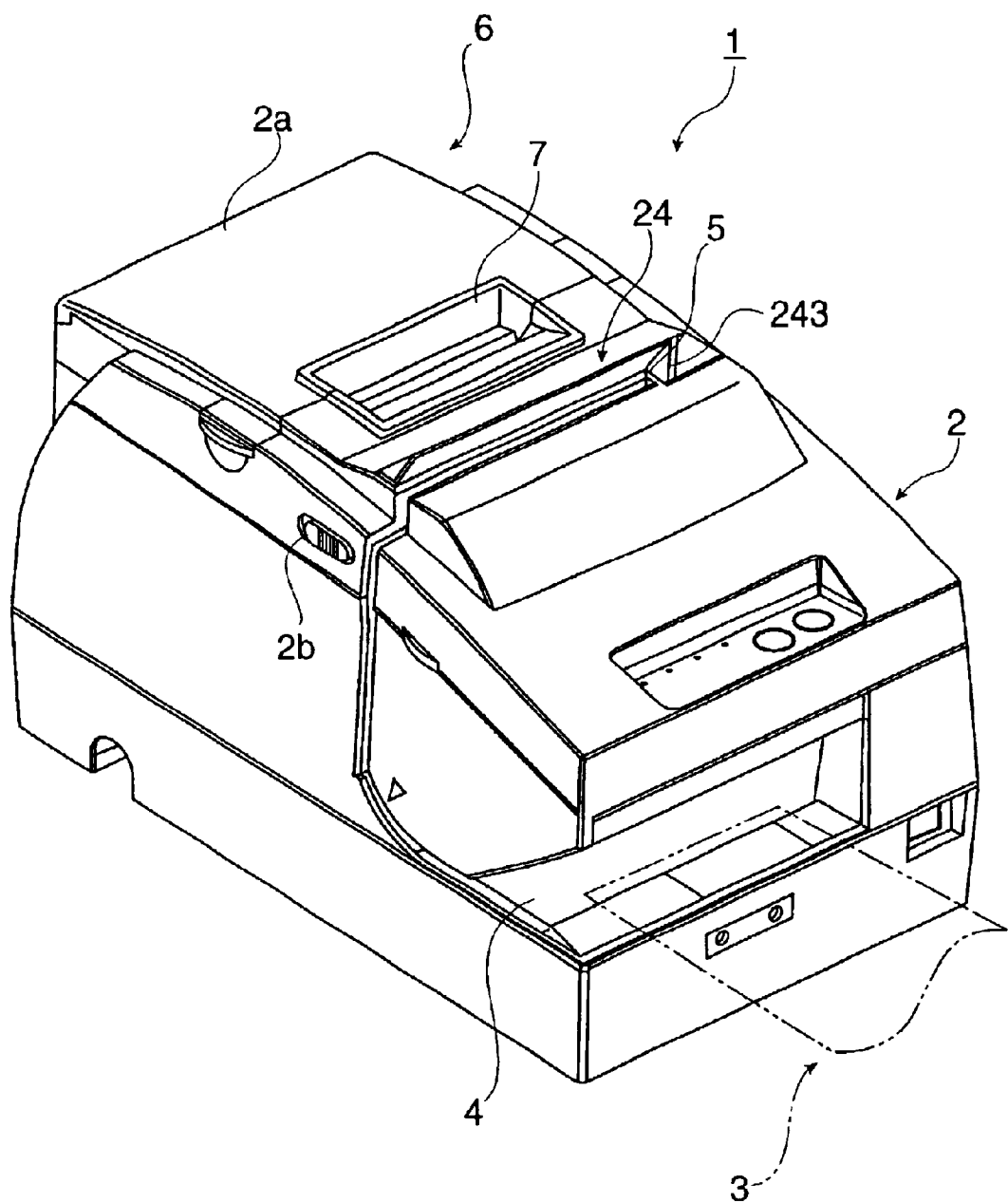
FIG. 1 is an external oblique view of a check processing apparatus, representing a preferred embodiment of a print media processing apparatus according to the present invention.

FIG. 1 is an external oblique view of a check processing apparatus 1 according to this embodiment of the invention. As shown in the figure this check processing apparatus 1 has a molded resin external cover 2, an insertion opening 4 formed in the front of the external cover 2 for inserting a check 3 in a substantially horizontal direction, and an exit opening 5, through which check 3 is ejected, formed in the top of the external cover 2. External cover 2 comprises a releasable cover 2a, located to the rear of the exit opening 5, which can be opened for everyday maintenance. The releasable cover 2a is adapted to pivot about the back end part of the apparatus, and can be opened by operating a sliding locking button 2b disposed near the top edge on one side the external cover 2.

Figure 9:
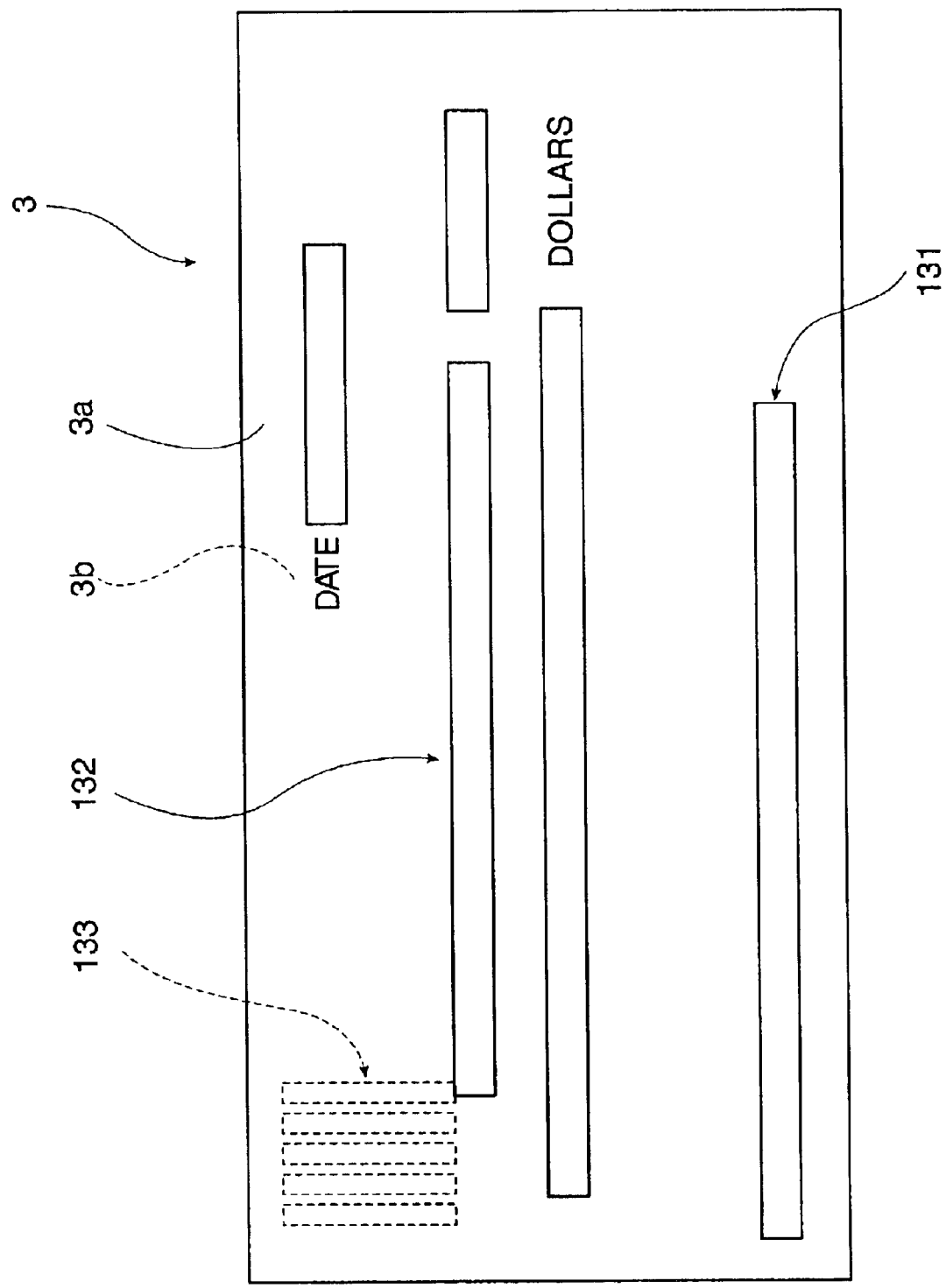
FIG. 9 is a plan view of a typical check.

The structure of a check 3, which is one example of print media processed by the check processing apparatus 1 according to this embodiment, is described next with reference to FIG. 9.

Check 3 is rectangular with a MICR recording area 131 formed near the bottom edge on the front 3a of the check. The account number of the check 3 and other information is recorded in this MICR recording area 131 using magnetic ink characters. A payment information area 132 for writing or printing the payee, date, and check amount is also formed on the front 3a of the check 3. An endorsement area 133 for printing the name of the store accepting the check and other endorsement information is also provided in a top corner on the back 3b of the check 3. This endorsement information may include a customer verification number, date, and check amount.

A check processing apparatus 1 according to this embodiment of the invention is capable of reading the magnetic ink characters recorded in the MICR recording area 131 of a check 3 thus configured, printing to the payment information area 132, printing to the endorsement area 133, and scanning or otherwise capturing the information printed in the payment information area 132.

Returning to FIG. 1, this check processing apparatus 1 also has a roll paper printing unit 6 at the back thereof. This roll paper printing unit 6 has a roll paper housing unit for storing the roll paper, a printing unit for printing to the roll paper, and a roll paper transportation mechanism for pulling the roll paper, from the roll paper storage unit, transporting the paper passed the printing unit, and ejecting the printed roll paper from the roll paper exit 7 formed in the external cover 2. A common roll paper printing mechanism can be used for this roll paper printing unit 6, and further depiction and description thereof in the figures and below is therefore omitted.

Figure 2:
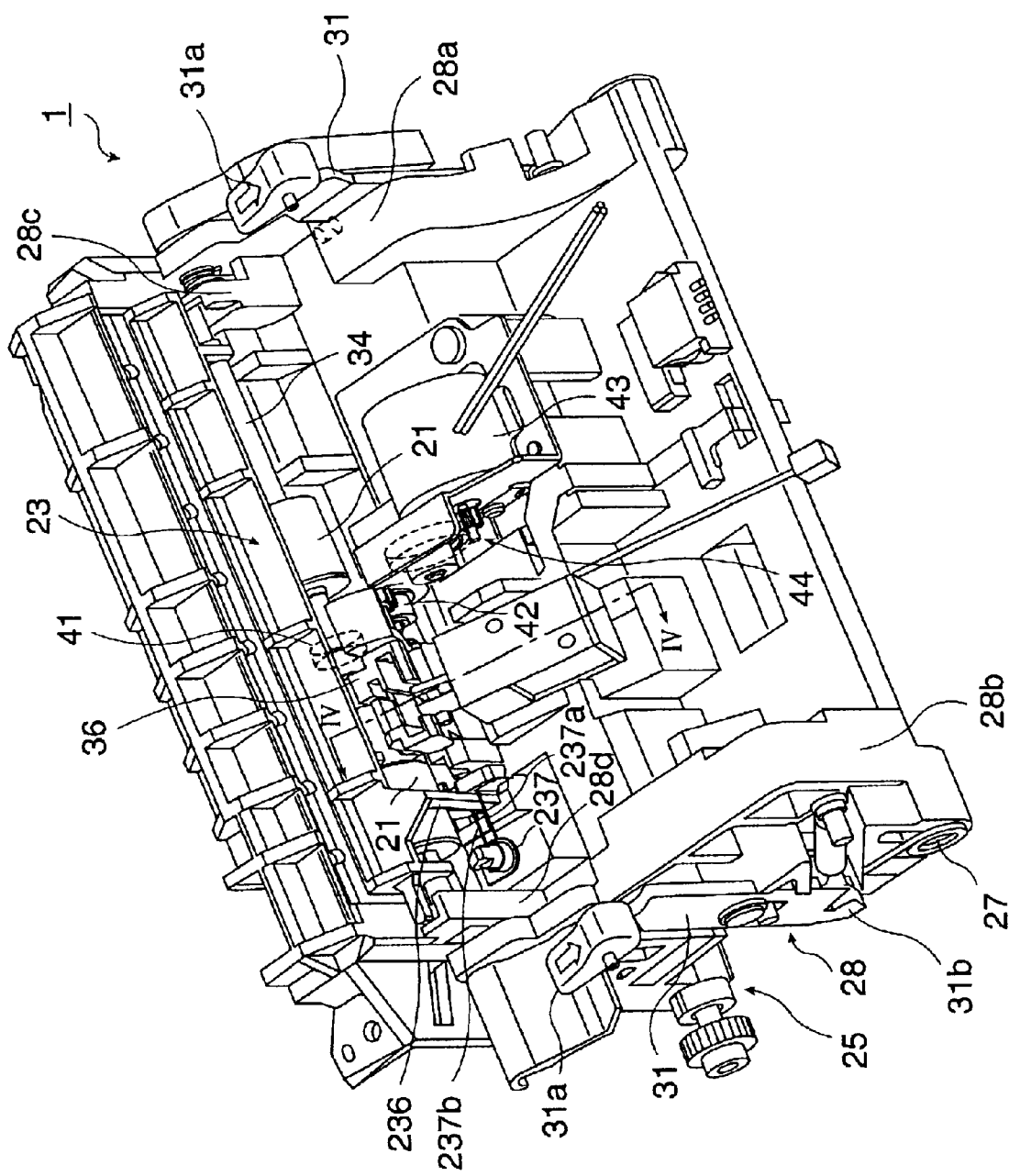
FIG. 2 is an oblique view showing the internal structure of the check processing apparatus in FIG. 1.
Figure 3:
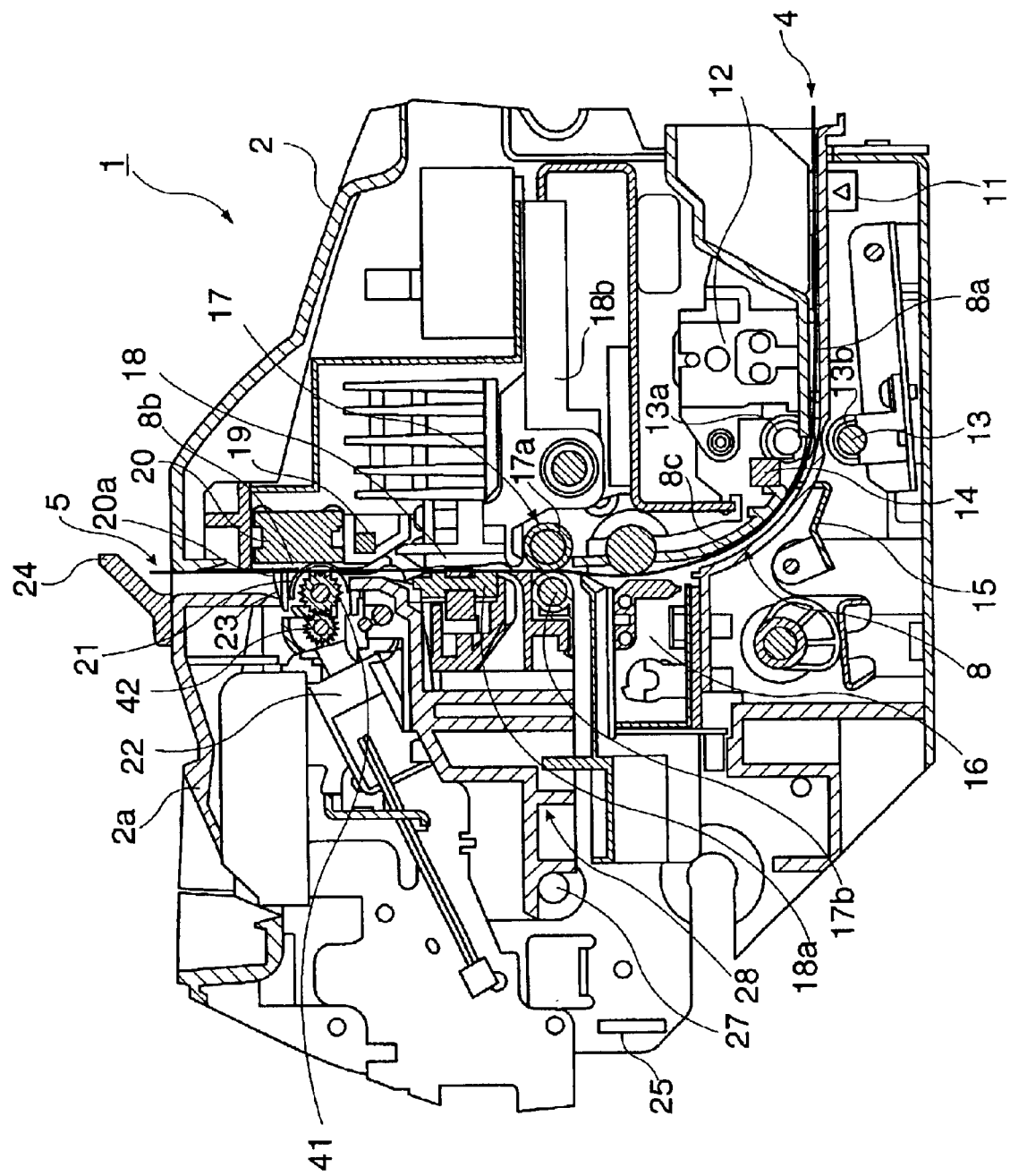
FIG. 3 is a section view of the check processing apparatus in FIG. 1.
Figure 4:
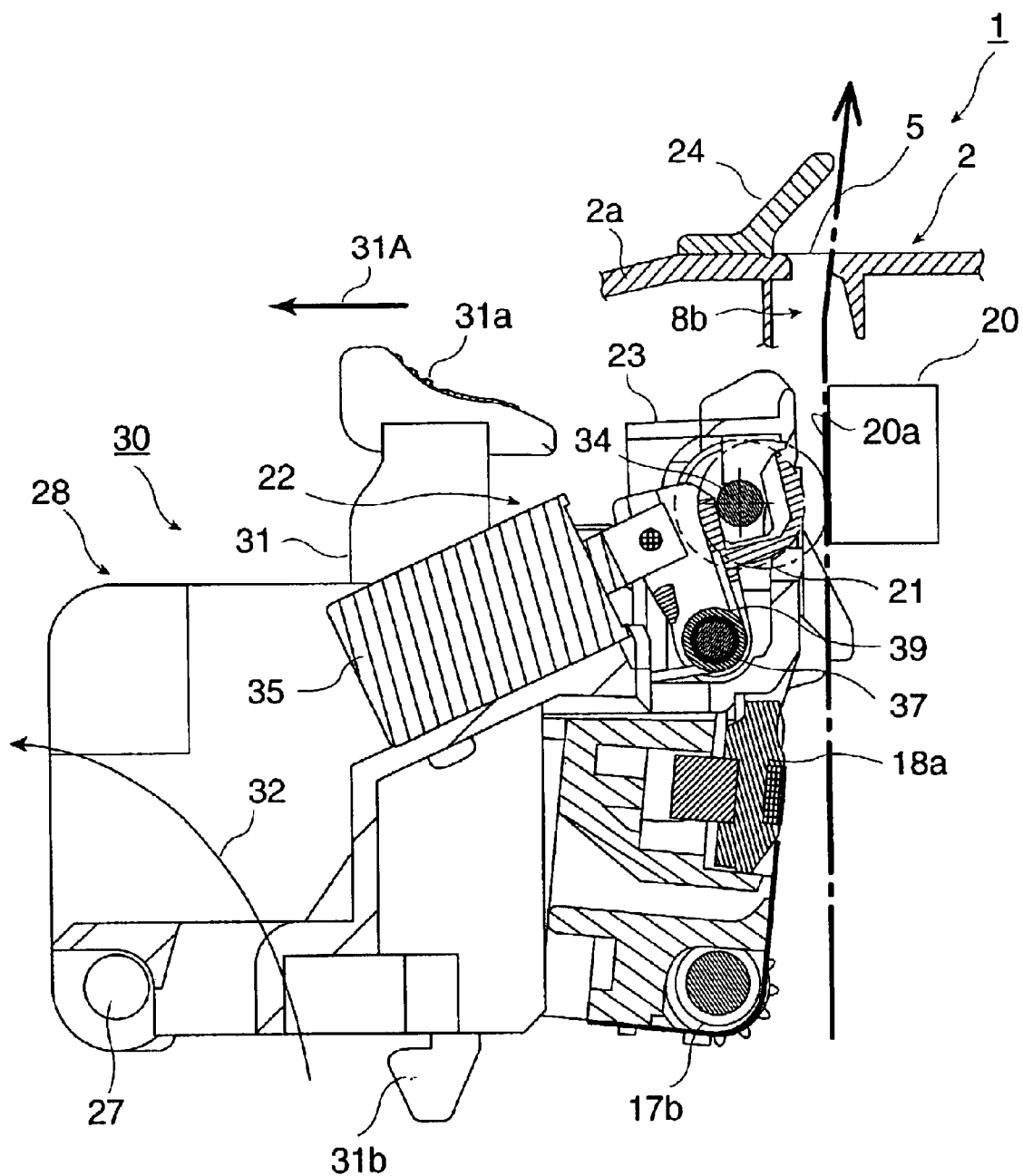
FIG. 4 is a partial section view showing the scanner feed unit part of the check processing apparatus in FIG. 1.

FIG. 2 is an oblique view from the back showing the basic internal structure of the check processing apparatus 1 with the external cover 2 removed. FIG. 3 is a section view showing the basic internal structure of the check processing apparatus 1, and FIG. 4 is a partial section view through line IV—IV in FIG. 2. The internal structure of the check processing apparatus 1 is further described below with reference to these figures.

A transportation path 8 through which check 3 is transported is formed inside the check processing apparatus 1 and extends from the insertion opening 4 to the exit opening 5. The insertion opening 4 side of this transportation path 8 is referred to below as the horizontal transportation path 8a, and the exit opening 5 part as the vertical transportation path 8b. The horizontal transportation path 8a and vertical transportation path 8b are joined by an arc-shaped or curved transportation path 8c.

Disposed along this transportation path 8 in order from the insertion opening 4 side are a trailing form edge detector 11, a MICR head (magnetic head) 12, a first feed roller pair 13, a leading form edge detector 14, a form positioning member 15, a back print head 16, a second feed roller pair 17, a front print head 18, a form ejection detector 19, and an image scanner 20.

Scanner feed rollers 21 are disposed opposite scanning surface 20a of the image scanner 20 to press the check 3 against surface 20a while transporting it over surface 20a.

The scanner feed rollers 21 are movable between a closed position and an open position by means of a roller retraction mechanism 22 (roller opening/closing mechanism) further described below. The scanner feed rollers 21 are pressed against the scanning surface 20a of image scanner 20 when in the closed position, and are retracted from this position so as not to apply pressure to the scanning surface 20a when in the open position.

An internal shield 23 for blocking external light is located in this embodiment at a position adjacent to the scanner feed rollers 21 on the downstream side relative to the transportation direction, that is, above the scanner feed rollers 21. This internal shield 23 is also movable between a contact position, in which the internal shield 23 is in contact with the scanning surface 20a, and a retracted position, in which it is removed from the contact position. The internal shield 23 moves in conjunction with movement of the scanner feed rollers 21 by the roller retraction mechanism 22. A dedicated drive mechanism for moving the internal shield 23 can be used.

When the internal shield 23 moves to the contact position external light from the exit opening 5 is blocked by the internal shield 23 and is thereby prevented from contacting or impinging on the scanning position of the image scanner 20 below the shield 23.

An external shield 24 for blocking external light is disposed outside the exit opening 5 in this example. This external shield 24 is attached to the outside surface of the external cover 2 and prevents external light from passing inside through exit opening 5.

The trailing edge detector 11, leading edge detector 14, and form ejection detector 19 are, for example, transparent or reflective photodetectors for contactlessly detecting the presence of the check 3 at respective positions along the transportation path 8.

The form positioning member 15 initially positions a check 3 inserted through the insertion opening 4 at a specific position. The form positioning member 15 is movable by appropriately driving a solenoid or other type of actuator between an operating position where the form positioning member 15 projects into the transportation path 8, and a retracted position where it is retracted from the transportation path 8.

The first feed roller pair 13 is a pair of rollers 13a, 13b positioned on opposing sides of the horizontal transportation path 8a. A check 3 inserted through the insertion opening 4 can be transported in a forward direction toward the exit opening 5 and in the opposite or reverse direction by appropriately driving either one of the rollers 13a, 13b. One of the rollers 13a, 13b is also retractable relative to the other roller so that the horizontal transportation path 8a part of transportation path 8 can be opened and closed by advancing or retracting the one roller relative to the other by means of a solenoid or other drive mechanism.

The second feed roller pair 17 is a pair of rollers 17a, 17b positioned on opposing sides of the vertical transportation path 8b for transporting a check 3 in forward or reverse direction by appropriately driving one of the rollers 17a, 17b. One of the rollers 17a, 17b is also retractable relative to the other roller so that the vertical transportation path 8b part of transportation path 8 can be opened and closed by advancing or retracting the one roller relative to the other by means of a solenoid or other drive mechanism.

The MICR head 12 is for reading magnetic ink characters printed to the front of a check 3. Check validity is determined based on the data read by the MICR head 12. A pressure member (not shown in the figure) for pressing a check 3 against the MICR head 12 for magnetic ink character reading is disposed opposite the MICR head 12, and is normally retracted from the MICR head 12 so that the horizontal transportation path 8a is open.

The front print head 18 is for printing the payee's name, date, amount, and other desirable information to the payment information area 132 on the front 3a of the check 3. The front print head 18 in this embodiment is a serial print head supported on a carriage 18b for printing a dot matrix of one or more columns while moving widthwise with respect to the check 3. A dot impact type print head for transferring ink from an ink ribbon to the check 3 is used as the front print head 18 in this preferred embodiment, but other types of print heads can be used instead.

The back print head 16 is used for printing a customer verification number, date, amount, and other information required for endorsement by the store to the endorsement area 133 on the back 3b of the check 3. The back print head 16 is a shuttle head having multiple heads spaced at specific intervals widthwise with respect to the check, each head printing a dot matrix of one or more columns by movement of the head within the width of this specific interval. A dot impact type print head for transferring ink from an ink ribbon to the check 3 is used as the back print head 16 in this preferred embodiment of the invention, but other types of heads can be used instead.

The image scanner 20 scans the front 3a of a printed check 3. The scanned image data is compressed and stored to a host computer (see FIG. 10) and used for electronic payment processing. The image scanner 20 in this embodiment is a contact image sensor (CIS), and scans with the check 3 pressed against the scanning surface 20a. The scanner feed rollers 21 are used to create this contact state for the scanning operation.

When a check 3 is scanned by the image scanner 20, the scanner feed rollers 21 transport the check 3 upward along the vertical transportation path 8b and feed the leading edge part of the check 3 out from the exit opening 5 at the top end of the vertical transportation path 8b. When scanning is completed, the check 3 is held vertically in the vertical transportation path 8b part above the scanner feed rollers 21 with the larger part on the leading end side of the check in the transportation direction sticking out from the exit opening 5. If the distance from the scanner feed rollers 21 to the exit opening 5 in this vertical transportation path 8b is sufficiently long, such as ⅙ or more of the transportation direction length of the check 3, the ejected check 3 can be held in the vertical transportation path 8b without falling from the check processing apparatus 1 after it is ejected.

Scanner Feed Unit

A movable frame 28 pivotable about support shaft 27 is attached to the main apparatus frame 25 on which the above-described components are mounted, and a scanner feed unit 30 is mounted on this movable frame 28. As will be understood from FIG. 4, the scanner feed rollers 21, roller retraction mechanism 22, internal shield 23, platen 18a disposed opposite the front print head 18, and roller 17b of second feed roller pair 17 are mounted on this scanner feed unit 30.

As shown in FIG. 2, lock levers 31 oriented lengthwise vertically are attached to the outside of the right and left side panels 28a, 28b of the movable frame 28 so that the lock levers 31 can pivot forward and back around the middle thereof. A operating button 31a is affixed to the top end part of each lock lever 31, and a hook 31b, lockable to an engaging member (not shown in the figure) formed on the main frame 25, is formed at the bottom end part of each lock lever 31. Pushing the operating button 31a away from the scanner (i.e., in the direction of the arrow shown on top of the operating button 31a in FIG. 2, and arrow 31A in FIG. 4) disengages the lock lever 31 from the locked position, thereby enabling the scanner feed unit 30 mounted on the movable frame 28 to be rotated back about shaft 27 as indicated by arrow 32 in FIG. 4. In this preferred embodiment of the invention the scanner feed unit 30 can be rotated a maximum of 90 degrees.

When the scanner feed unit 30 is thus retracted the vertical transportation path 8b area is open wide, facilitating cleaning the scanning surface 20a of image scanner 20, replacing the ink ribbon for print heads 16 and 18, removing paper jams between the image scanner 20 and scanner feed rollers 21, and other maintenance tasks.

Roller Retraction Mechanism

Figure 5:
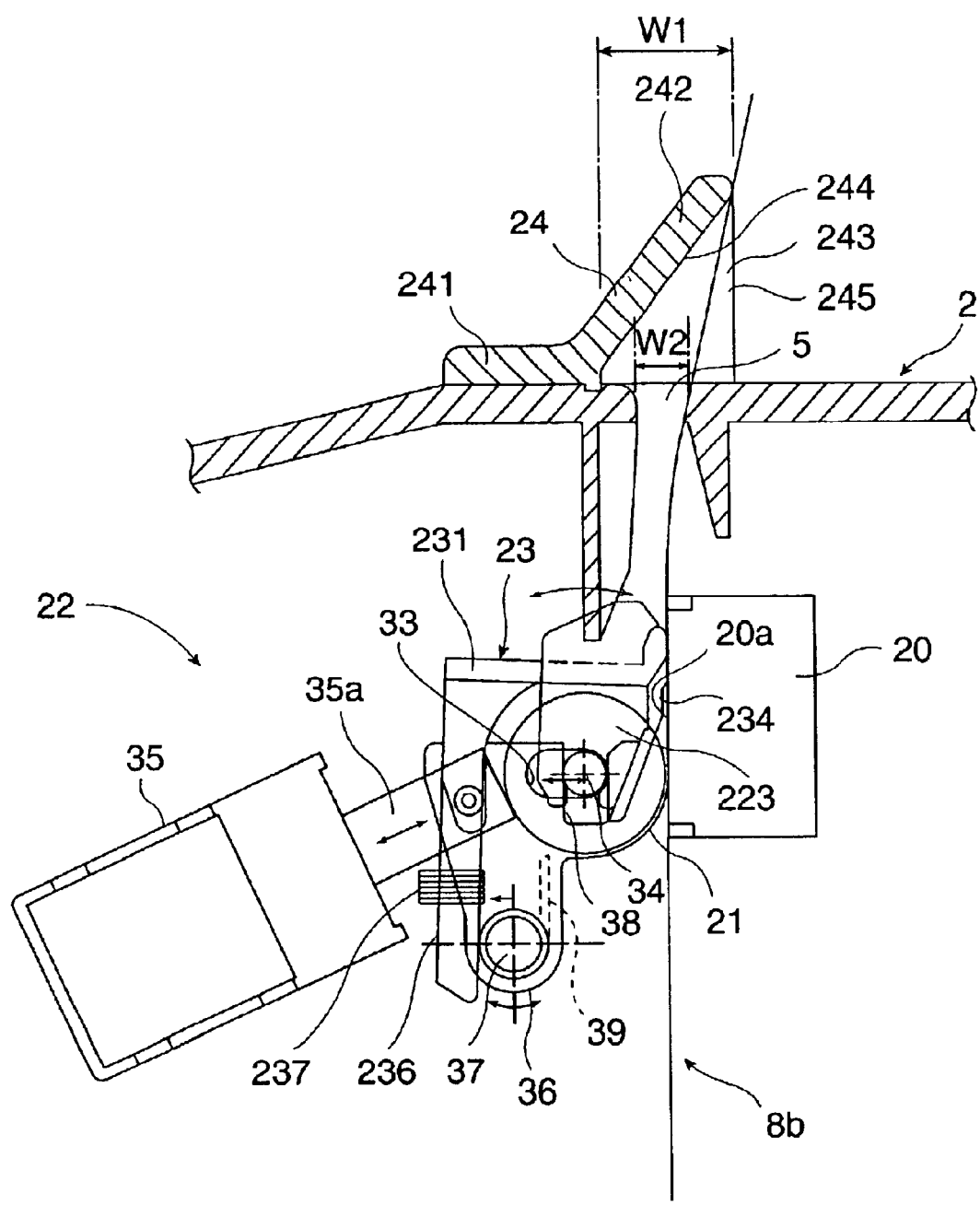
FIG. 5 is a side view showing the positional relationship of the roller retraction mechanism, internal shield, and external shield.

FIG. 5 is a side viewing showing the positional relationship of roller retraction mechanism 22, internal shield 23, and external shield 24. The configuration of the scanner feed roller 21 and roller retraction mechanism 22 in this embodiment is described next with reference to FIGS. 2, 3, and 4.

First, a roller support shaft 34 spans the apparatus widthwise between the right and left side panels 28c, 28d of the movable frame 28. A pair of scanner feed rollers 21 are coaxially mounted with a specific space therebetween on this roller support shaft 34. The roller support shaft 34 is supported in a guide channel 33 formed in the side panels 28c, 28d and are elongated in the front-back direction of the apparatus so that the roller support shaft 34 can slide along this guide channel 33 horizontally in this front-back direction. The roller support shaft 34 is also linked at the widthwise middle thereof to the roller retraction mechanism 22.

The roller retraction mechanism 22 includes a solenoid 35 and a pressure lever 36 that is linked to the solenoid operating rod 35a and supported on a pivot shaft 37. The pressure lever 36 can thus be driven on pivot shaft 37 in the front-back direction of the apparatus by appropriately driving the solenoid 35. The pressure lever 36 has a slot 38 in the part thereof on the vertical transportation path 8b side. The roller support shaft 34 passes through and rotates freely in this slot 38. A pressure spring 39, which is a torsion spring in this embodiment, constantly urges the pressure lever 36 toward the scanning surface 20a.

Figure 6A:
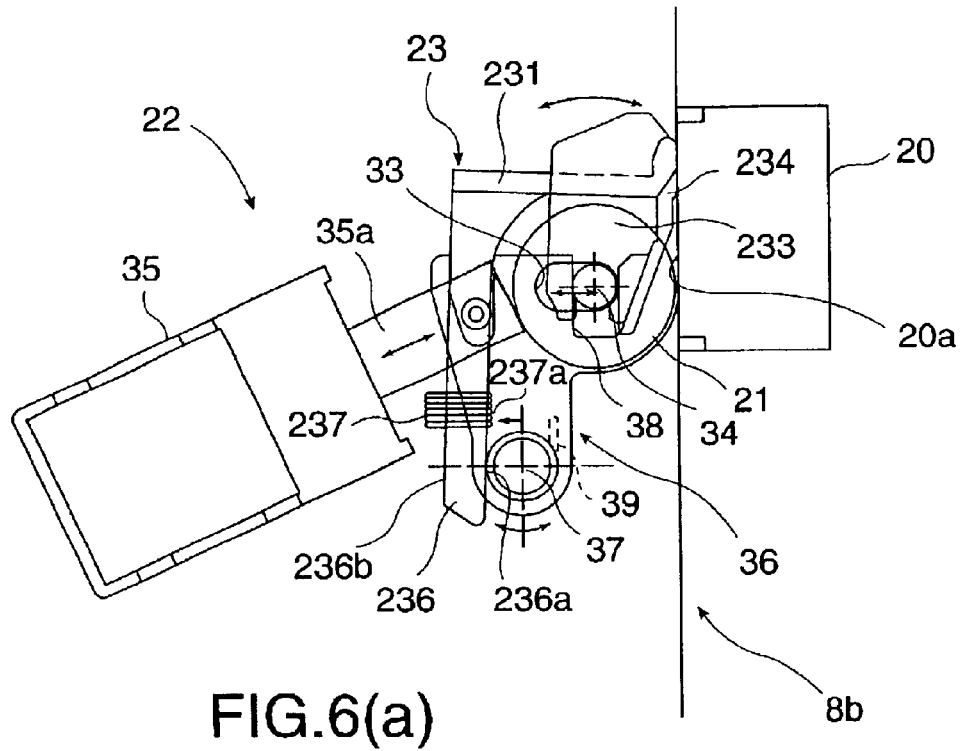
FIGS. 6(a) and 6(b) illustrates the operation of the internal shield and scanner feed rollers by the roller retraction mechanism.
Figure 6B:
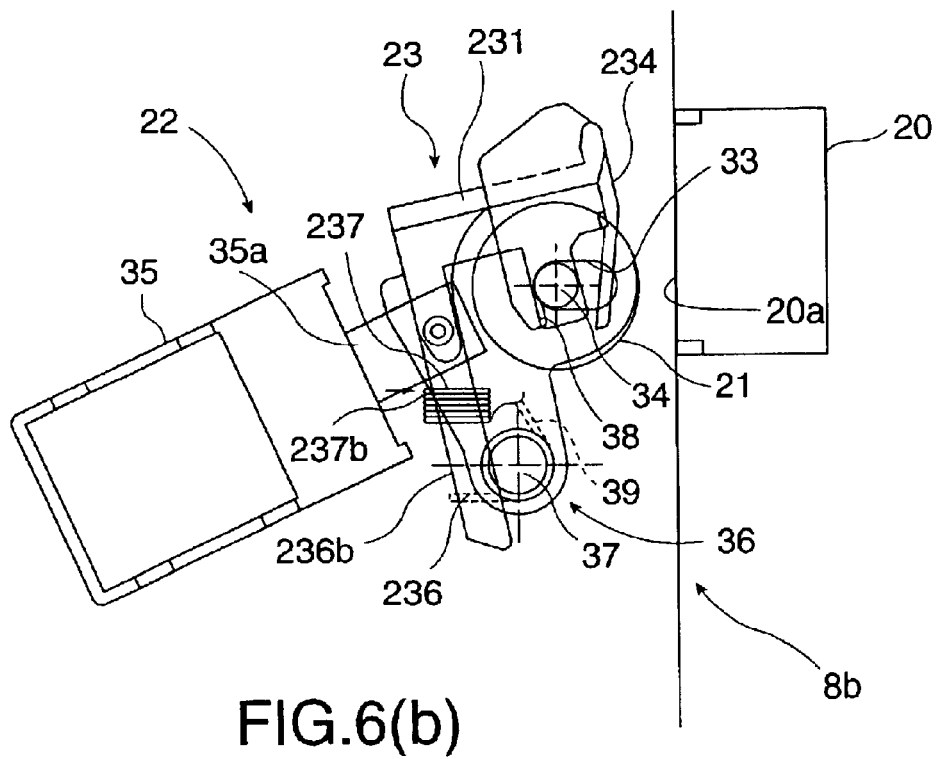

FIGS. 6(a) and 6(b) show the operation of this roller retraction mechanism 22.

When the solenoid 35 of roller retraction mechanism 22 is on, the operating rod 35a is withdrawn into the solenoid 35 so that the pressure lever 36 rotates around pivot shaft 37 against the force of pressure spring 39 and is held in the position retracted from the scanning surface 20a of image scanner 20, as shown in FIG. 6(b). Because the roller support shaft 34 is held in slot 38 of pressure lever 36, the roller support shaft 34 is also positioned at the back side of the apparatus in guide channel 33. As a result the pair of scanner feed rollers 21 mounted on the roller support shaft 34 are also in the open position separated from the image scanner 20 and the vertical transportation path 8b is open. When no scanning is occurring, the scanner feed rollers 21 are held in this open position, thus avoiding the check 3 being caught by the scanner feed rollers 21.

When the solenoid 35 turns off the operating rod 35a returns to the extended position, enabling the force of pressure spring 39 to rotate the pressure lever 36 linked to the end of the operating rod 35a on pivot shaft 37 back to the image scanner 20 side. The roller support shaft 34 therefore slides along guide channel 33 to the front of the apparatus. This results in the scanner feed rollers 21 mounted on the roller support shaft 34 being held in the closed position at which the scanner feed rollers 21 are pressed against the scanning surface 20a of image scanner 20 by the force of pressure spring 39.

It should be noted that the roller retraction mechanism 22 described in this example could alternatively use a latching solenoid that normally holds the operating rod 35a in the retracted position and extends and retracts when current is applied.

After a check 3 is carried to the scanning start position by the first feed roller pair 13 and second feed roller pair 17 for scanning, the scanner feed rollers 21 are moved to the closed position to press the check 3 against the scanning surface 20a of image scanner 20 and the scanner feed rollers 21 are then rotationally driven to advance the check 3.

The roller retraction mechanism 22 thus comprised slides the roller support shaft 34 of scanner feed rollers 21 forward and back by means of a pressure lever 36 that pivots back and forth on a pivot shaft 37. The roller retraction mechanism 22 can therefore be compactly made and the rollers 21 can advance and retract smoothly.

Moreover, the pressure lever 36 freely rotatably supports the roller support shaft 34 between the pair of right and left scanner feed rollers 21. The pair of rollers 21 can therefore be urged with substantially equal pressure on each roller by a single pressure spring 39; the pair of rollers 21 is held substantially parallel during the retraction operation, and the vertical transportation path 8b can be reliably opened.

It should be noted that a drive system for driving the scanner feed rollers 21 is part of the roller retraction mechanism 22 in this embodiment. As shown in FIG. 2 and FIG. 3 this scanner feed roller 21 drive train includes a first gear 41 integrally disposed on the roller support shaft 34 between the pair of scanner feed rollers 21, a second gear 42 disposed on pivot shaft 37 and constantly engaged with the first gear 41, and a gear train 44 for transferring drive power from a scanner feed motor 43 to the second gear 42.

Because the transfer path for roller drive power is configured in the support part of the roller support shaft 34, drive power can be reliably transferred to the scanner feed rollers 21. Furthermore, by juxtaposing the position where pressure spring 39 works on the roller support shaft 34 and the position where drive power is transferred to the roller support shaft 34, the scanner feed rollers 21 can be turned without disrupting the pressure balance.

Internal Shield

Figure 7A:
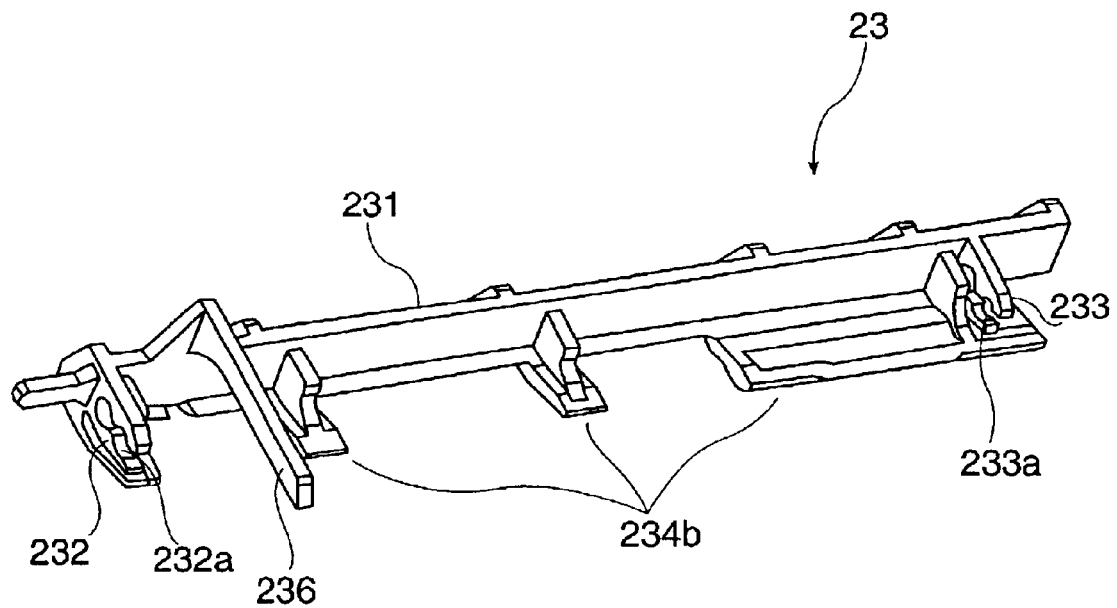
FIGS. 7(a) and 7(b) are oblique views of the internal shield.
Figure 7B:
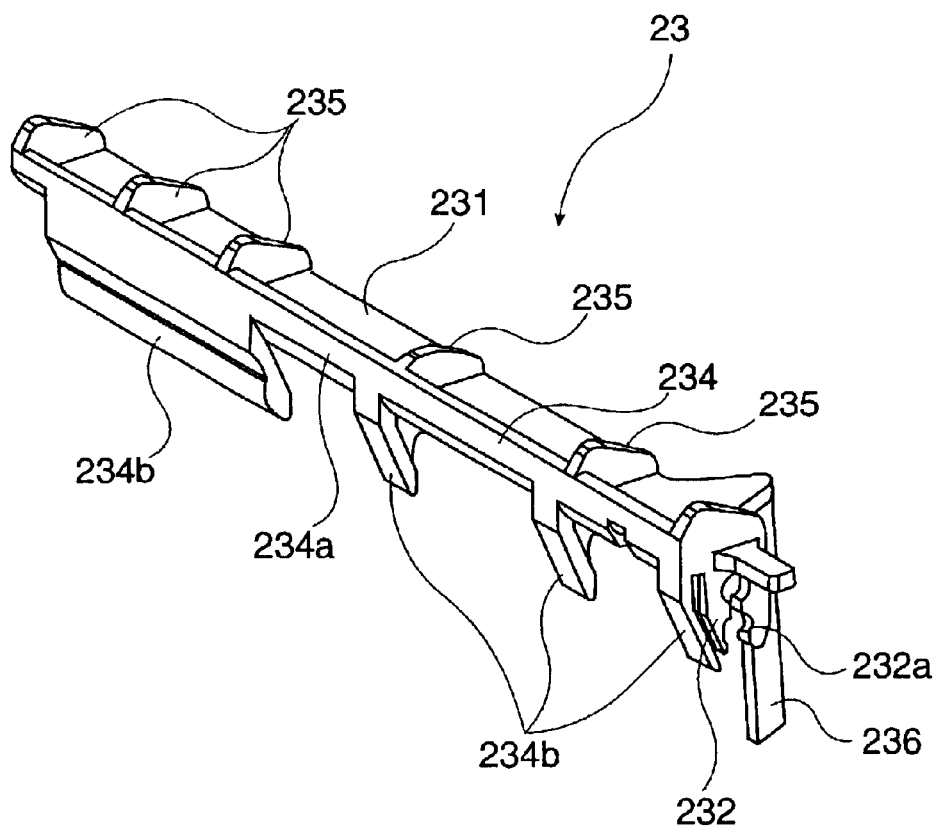

The internal shield 23, the movement of which is linked to the movement of scanner feed rollers 21 by the above-described roller retraction mechanism 22, is described next. FIG. 7 is an oblique view of the internal shield when removed. The internal shield 23 in this example has a long, narrow, rectangular main shield part 231, support leg parts 232, 233 projecting perpendicularly from opposite ends of the main shield part 231, and guide sled 234 formed at the front edge of the main shield part 231 as seen in the figure. A number of reinforcing ribs 235 are formed at a specific interval on the top surface of the main shield part 231. Channels 232a and 233a for inserting the roller support shaft 34 thereto from below and holding the shaft 34 so that it rotates freely therein are formed at the bottom end part of the support leg parts 232, 233. The internal shield 23 is mounted to the roller support shaft 34 by inserting the roller support shaft 34 from below into channels 232a and 233a, and can rotate in the front-back direction of the apparatus on the roller support shaft 34.

The guide sled 234 opposes the scanning surface 20a and includes a perpendicular part 234a perpendicular to the main shield part 231, and incline parts 234b sloping away from the scanning surface 20a contiguously from the bottom edge of the vertical part 234a. This guide sled 234 guides check 3 as it is transported through vertical transportation path 8b.

A spring catch 236 is formed projecting perpendicularly from the left end part of the main shield part 231 at a position to the inside of support leg part 232. A torsion spring 237 is held parallel by the movable frame 28 at the bottom of this spring catch 236. That is, one end 237a of the torsion spring 237 is positioned at the front side of the apparatus and the other end 237b is positioned at the back side of the apparatus. The bottom end part of the spring catch 236 is inserted between these ends 237a, 237b.

Because the internal shield 23 in this example is supported by a roller support shaft 34 that slides front-back, the internal shield 23 also moves front-back in conjunction with the roller support shaft 34 when the roller support shaft 34 slides front-back. That is, as shown in FIG. 6(a), when the scanner feed rollers 21 are positioned to apply pressure to the scanning surface 20a, the vertical part 234a of guide sled 234 at the front of the internal shield 23 is also in a contact position contacting the scanning surface 20a.

When thus positioned the front edge 236a of spring catch 236 is pushed from the back to the front end part 237a of the torsion spring 237. The result is that spring catch 236 is urged to the back by the force of the spring. Because the position where the spring force works is below the rotational center of the internal shield 23, the guide sled 234 side located above the rotational center is urged toward the scanning surface 20a.

When a check is scanned with the image scanner 20 the internal shield 23 is in the shield position. The guide sled 234 of internal shield 23 is therefore pressed with a specific spring force to the back 3b of a check 3 transported along the vertical transportation path 8b toward the top exit opening 5 by the scanner feed rollers 21 while the check is scanned. Because the check 3 is thus transported with no gap between the guide sled 234 and scanning surface 20a, external light that by chance penetrates through the exit opening 5 is blocked by the main shield part 231 of the internal shield 23 and is thereby prevented from reaching the scanning position of the image scanner 20 below the main shield part 231. Problems such as a drop in scanned image quality, resulting from penetration of external light to the scanning position, can therefore be reliably prevented.

When the scanner feed rollers 21 are set to the retracted position as shown in FIG. 6(b) when scanning is not in progress, the internal shield 23 also retracts to its retracted position. Problems such as a check 3 encountering the internal shield 23 during advancement through the vertical transportation path 8b, thereby obstructing smooth transportation of the check, can therefore be reliably avoided.

When thus positioned the back edge 236b of the spring catch 236 is urged from the front to the back side end part 237b of the torsion spring 237. The spring catch 236 is thereby urged forward, and the guide sled 234 at the top is urged to the retracted position.

The internal shield 23 can therefore be reliably held in the retracted position by spring force, and problems such as external vibration or other factor causing the internal shield 23 to close the vertical transportation path 8b can be reliably prevented.

It should be noted that the internal shield 23 is moved by the roller retraction mechanism 22 in this preferred embodiment but a separate mechanism for moving the internal shield could be provided.

It will also be apparent that a blade spring or other type of spring may be used in place of the torsion spring 237, and a plurality of spring members could also be used.

External Shield

The external shield 24 is described next. The internal shield 23 described above can prevent external light entering from the exit opening 5 and contacting or impinging on the scanning position. However, if the transported check is not flat but has a sharp fold or wrinkles it can push the internal shield 23 against the spring force when it passes between the internal shield 23 and scanning surface 20a, and a gap can result between the internal shield 23 and scanning surface 20a. Such gaps are undesirable because they permit external light to pass therethrough and illuminate the scanning position therebelow.

In consideration of this problem the present embodiment provides an external shield 24 in addition to the above-described internal shield 23. Referring to FIG. 1 and FIG. 5, the external shield 24 has a somewhat L-shaped section with an angle greater than 90°, and is long in the widthwise dimension with respect to the apparatus. The external shield 24 has a mounting panel part 241 attached to the releasable cover 2a part of the external cover 2, and a shield part 242 sloping upward to the front from the front edge of the mounting panel part 241. A triangular side part 243 perpendicular to the shield part 242 is formed at the right end part of the external shield 24 as seen in FIG. 1.

The inclined surface 244 on the inside of shield part 242 functions as a guide surface for guiding a check 3 ejected vertically upward from the exit opening 5 into a horizontal direction. This inclined surface 244 has a gradual slope of approximately 30° relative to the orientation of the vertical transportation path 8b so that the ejection direction of the vertically transported check does not change suddenly but rather changes gradually so that the check 3 can be smoothly ejected. The slope of this guide surface should be determined appropriately according to the application. The guide surface could also be a concave curve or convex curve instead of being a straight inclined surface.

Furthermore, the width of the shield part 242 is set so that the shield part 242 completely covers the exit opening 5 when seen in the direction of the vertical transportation path 8b so that no external light passes inside from the exit opening 5. In other words, the width W1 of the shield part 242 as seen looking up in line with the vertical transportation path 8b is set to completely include the width W2 of the exit opening 5.

So that external light incident at an angle to the exit opening 5 from the opening 245 defined by shield part 242 and releasable cover 2a of the external cover 2 does not pass to the scanning position, the external shield 24 is located on the side of the vertical transportation path 8b opposite the image scanner 20.

It should be noted that the external shield 24 is fixed to the external cover 2 with adhesive, for example, in the present embodiment, but the external shield 24 could be removably mounted to the external cover 2. The external shield 24 could also be disposed on the external cover 2 so that it can rotate around a back edge part of the mounting panel part 241.

Scanning Position

The scanning position of the image scanner 20 is described next with reference to FIG. 8.

Figure 8:
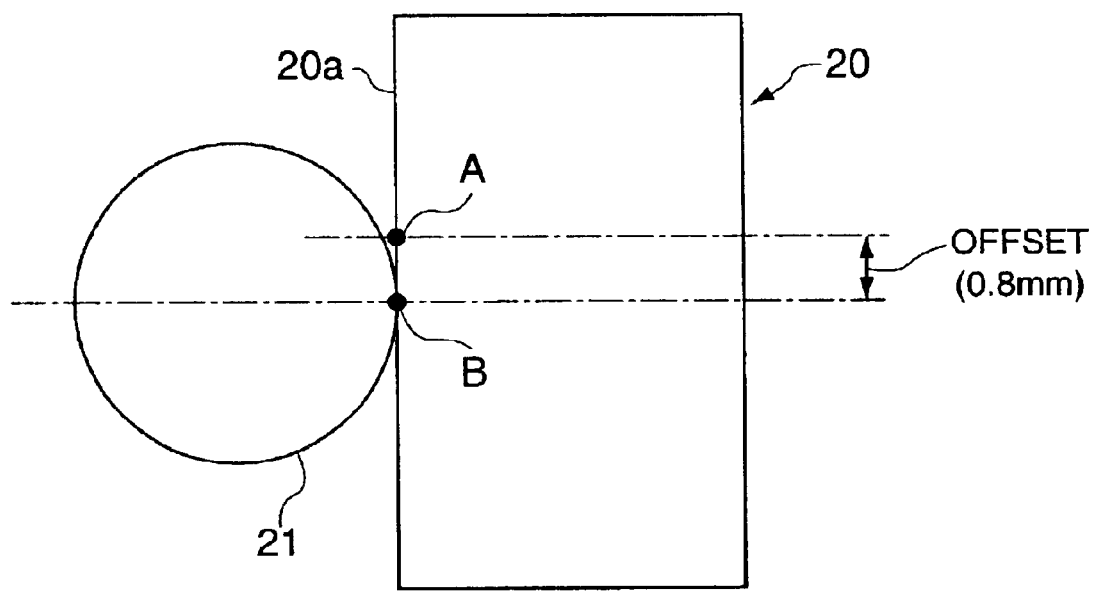
FIG. 8 illustrates the scanning position of the image scanner.

As shown in FIG. 8 the position of the scanner feed rollers 21 is set so that the rollers 21 do not press the check 3 at the scanning position of the image scanner 20, that is, at focal point A, but rather press the check 3 at a position slightly offset from focal point A. That is, scanner focal point A is offset either upstream or downstream in the transportation direction from scanner contact position B where the scanner feed rollers 21 meet the scanning surface. In this exemplary embodiment, scanner focal point A is set offset 0.8 mm downstream in the transportation direction (i.e., toward the exit opening 5 side) from the scanner feed roller scanner contact position B.

The scanner feed rollers 21 are thus prevented from applying pressure directly at the scanner focal position A. Transfer of ink from the check to the scanner focal position A when scanning a just-printed check 3 can therefore be reduced, and a drop in scanned image quality due to such adherent ink can be prevented.

Furthermore, the scannable area at the leading edge side of the check 3 can be increased by offsetting scanner focal position A downstream in the transportation direction from the scanner contact position B of scanner feed rollers 21.

Note that if the scanner focal position A is offset greatly from the scanner contact position B of the scanner feed rollers 21, the check 3 can move away from the scanning surface 20a at the scanner focal position A. However, by using an offset of only 0.8 mm as in the present embodiment the check 3 separates from the scanning surface 20a by 0.2 mm or less, and there is no concern about a drop in scanned image quality.

Control System

Figure 10:
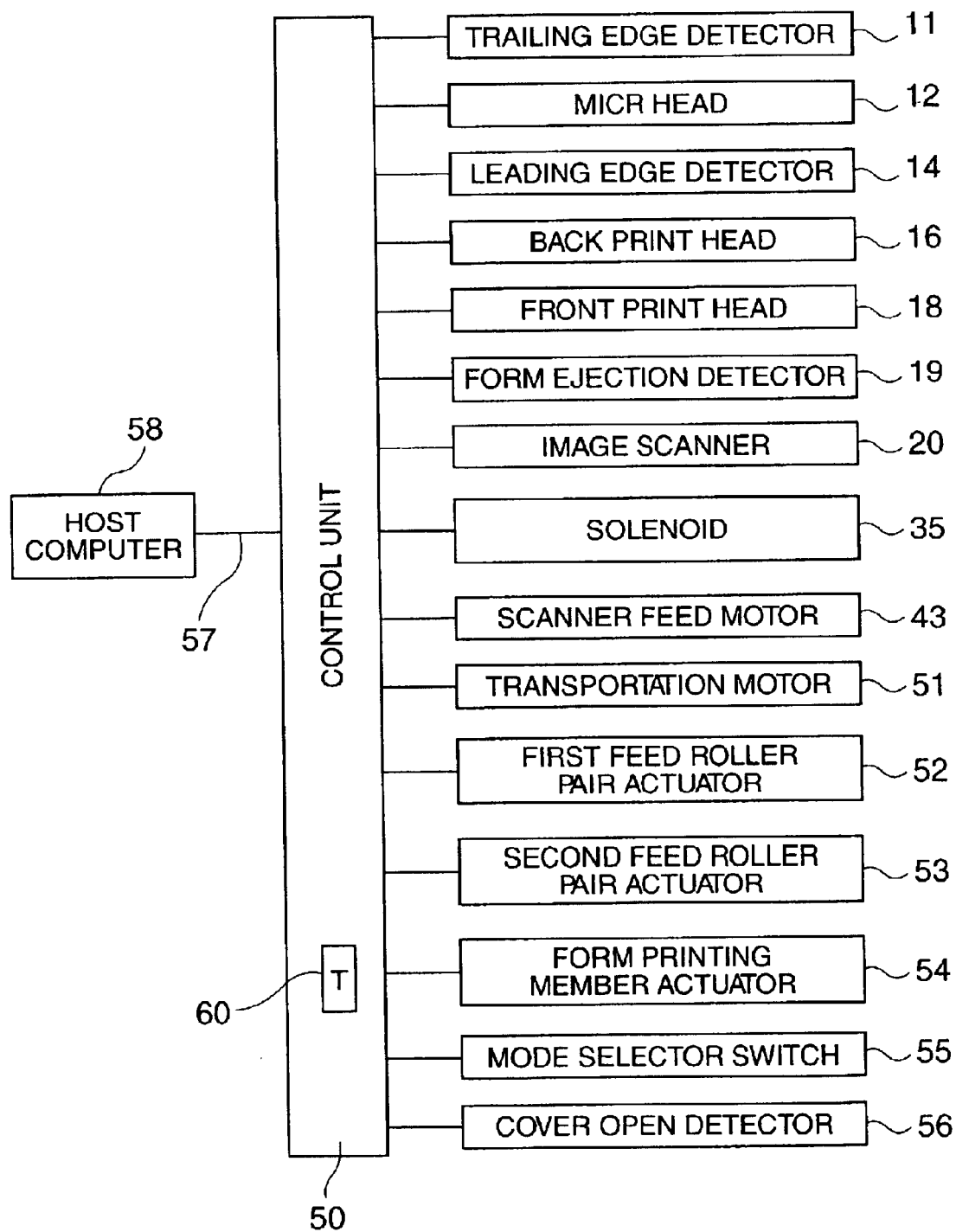
FIG. 10 is a block diagram of the control system of the check processing apparatus in FIG. 1.

FIG. 10 is a block diagram of the control system of the check processing apparatus 1 according to this embodiment of the invention. As shown in FIG. 10 the check processing apparatus 1 has a control unit 50 comprising a CPU, ROM, RAM, and other devices. In addition to the above-described trailing edge detector 11, MICR head 12, leading edge detector 14, back print head 16, front print head 18, form ejection detector 19, image scanner 20, scanner feed roller solenoid 35, and scanner feed motor 43, the check processing apparatus 1 has a transportation motor 51 for driving the first feed roller pair 13 and second feed roller pair 17; a first feed roller pair actuator 52 for opening and closing the first feed roller pair 13; a second feed roller pair actuator 53 for opening and closing the second feed roller pair 17; a form printing member actuator 54 for moving the form positioning member 15 between the open and closed positions; a mode selector switch 55 for setting the processing mode of the check processing apparatus; and a cover open detector 56 for detecting if the cover 2a is open.

The control unit 50 is connected to a higher host computer 58 via a communication line 57, for example, in order to exchange various types of information with the host computer 58. Following a control program stored in ROM, for example, the control unit 50 controls and drives the components based on detection signals from the various detectors to execute the process of the operating mode set by the mode selector switch 55 or the process of the operating mode indicated by a command from the host computer 58.

The control unit 50 in this example functions as a roller position control means for driving the roller retraction mechanism 22 and controlling the position of the scanner feed rollers 21. That is, the open scanner feed rollers 21 are moved to the closed position when the check 3 reaches the scanner focal position A (see FIG. 8). A built-in timer 60 measures the time elapsed from when scanning ends, and the scanner feed rollers 21 are moved from the closed position to the open position when the elapsed time reaches a predefined time T. If the operating mode selected by the mode selector switch 55 or command from the host computer 58 involves only printing (such as in a form printing mode), the roller retraction mechanism 22 is controlled to hold the scanner feed rollers 21 in the open position.

Processing Operations

Figure 11:
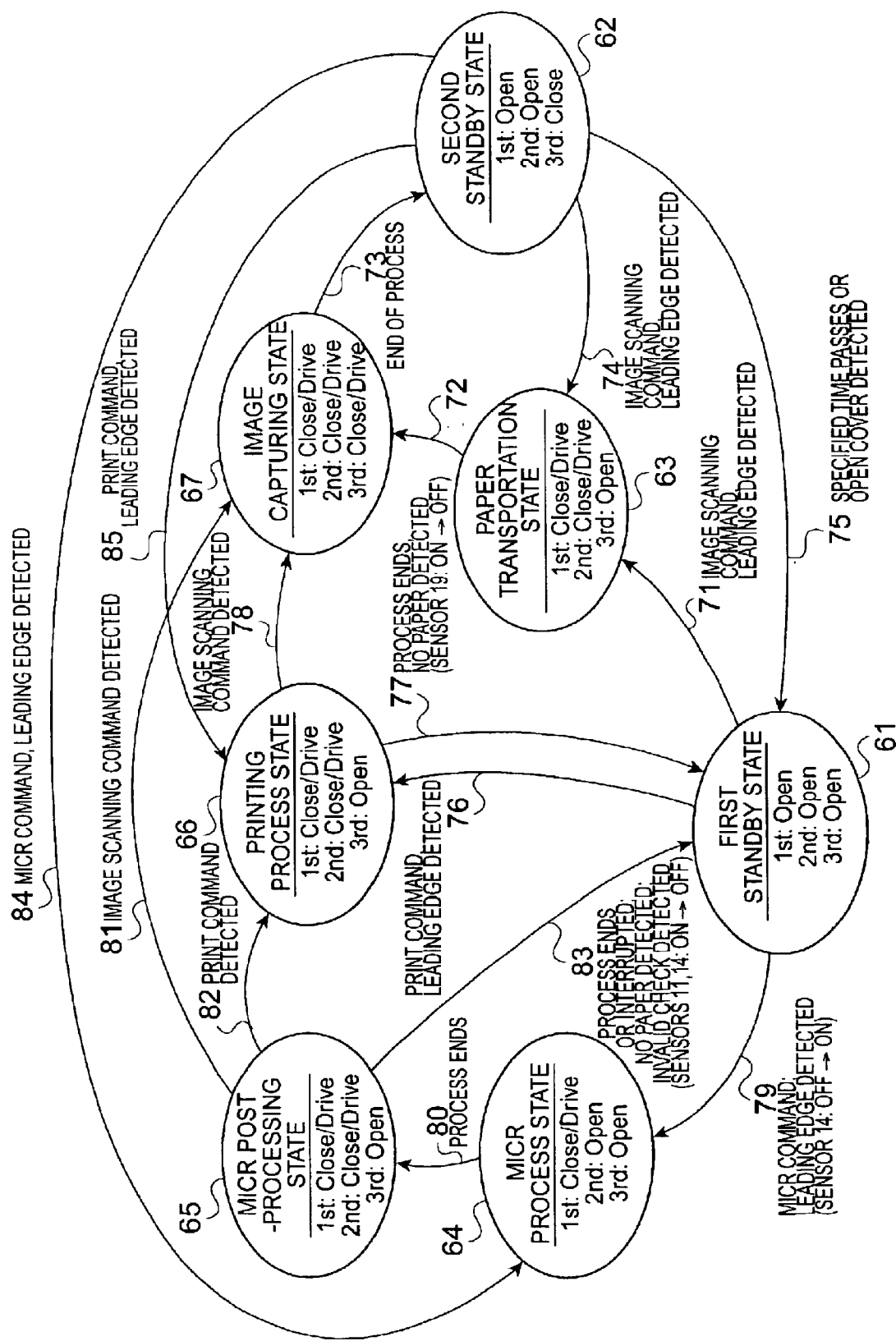
FIG. 11 is a state transition diagram for the check processing apparatus in FIG. 1.

Some processing operations run by the check processing apparatus 1 of the present embodiment are described next. FIG. 11 is a state change diagram of the check processing apparatus 1 in this embodiment.

This check processing apparatus 1 has a first standby state 61 and a second standby state 62. In the first standby state 61 the first feed roller pair 13 and second feed roller pair 17 are open and the scanner feed rollers 21 are in the open position. That is, the transportation path 8 is OPEN. In the second standby state 62 the first feed roller pair 13 and second feed roller pair 17 are open but the scanner feed rollers 21 are in the closed position in contact with the scanning surface 20a, i.e., the transportation path 8 is CLOSED.

Check processing apparatus 1 operating states include a paper transportation state 63, MICR process state 64 for reading with the MICR head 12, MICR post-processing state 65, i.e., the processing state following the MICR process state 64, a printing process state 66 using either back print head 16 or 18, and an image capturing state 67 for scanning with the image scanner 20.

In the paper transportation state 63 the first and second feed roller pairs 13, 17 are closed and rotationally driven (CLOSE/DRIVE) and the scanner feed rollers 21 is in the open position (OPEN). When in this state a check 3 can be transported along the transportation path 8 by the first feed roller pair 13 and/or second feed roller pair 17.

In the MICR process state 64 only the first feed roller pair 13 is in the CLOSE/DRIVE state enabling it to transport a check 3, and a check 3 transported by the first feed roller pair 13 can be read by the MICR head 12. The MICR post-processing state 65 is a transition state following completion of reading the check 3 with the MICR head 12, and as in the paper transportation state 63 the check 3 can be transported by the first and second feed roller pairs 13, 17.

As in the paper transportation state 63, a check 3 can also be transported by the first and second feed roller pairs 13, 17 in the printing process state 66, and the front or back of the check 3 can be printed in this state by appropriately driving back print head 16 or 18.

In the image capturing state 67 a check 3 can be transported by the first and second feed roller pairs 13, 17 and scanner feed rollers 21, and an image of the printed check 3 can be captured by the image scanner 20 in this state.

State transitions are triggered as described next.

If a scan image command is asserted and the leading edge of a check 3 inserted from the insertion opening 4 is detected by the leading edge detector 14 in the first standby state 61, which is the initialization state, the state transition passes through the paper transportation state 63 as indicated by arrow 71 to the image capturing state 67 as indicated by arrow 72. When the image scanner 20 finishes scanning the image, there is another state transition from the image capturing state 67 to the second standby state 62 as indicated by arrow 73.

If a scan image command is asserted and the leading edge of a check 3 inserted from the insertion opening 4 is detected by the leading edge detector 14 in the second standby state 62, the operating state transitions to the paper transportation state 63 as indicated by arrow 74. If while in the second standby state 62 the specified time T elapses or the cover open detector 56 detects that the cover 2*a* is open, the first standby state 61 is resumed as indicated by arrow 75. However, if an MICR command is applied and the leading form edge is detected, the operating state transitions to the MICR process state 64 as indicated by arrow 84. Also, if a print command is applied and the leading form edge is detected, the operating state transitions to the printing process state 64 as indicated by arrow 85.

If in the first standby state 61 a print command is asserted and the leading edge of the check 3 is detected the printing process state 66 is assumed as indicated by arrow 76. When printing in the printing process state 66 is completed and the trailing edge of the check 3 is detected by form ejection detector 19, the first standby state 61 is resumed as indicated by arrow 77. If a scan image command is asserted while in the printing process state 66, the image capturing state 67 is entered after the printing process as indicated by arrow 78.

If a MICR command is detected and the leading edge of the check 3 is detected by the leading edge detector 14 while in the first standby state 61, the MICR process state 64 is assumed as indicated by arrow 79. The MICR post-processing state 65 is thereafter automatically entered as indicated by arrow 80. The image capturing state 67 is entered as indicated by arrow 81 if a scan image command is then detected, and the printing process state 66 is entered as indicated by arrow 82 if a print command is detected.

If processing then ends or if the check is deemed invalid, the first standby state 61 is resumed as indicated by arrow 83 after the completion of check ejection is detected (that is, detectors 11, 14, and 19 are off).

Operating Process

EXAMPLE 1

Figure 12:
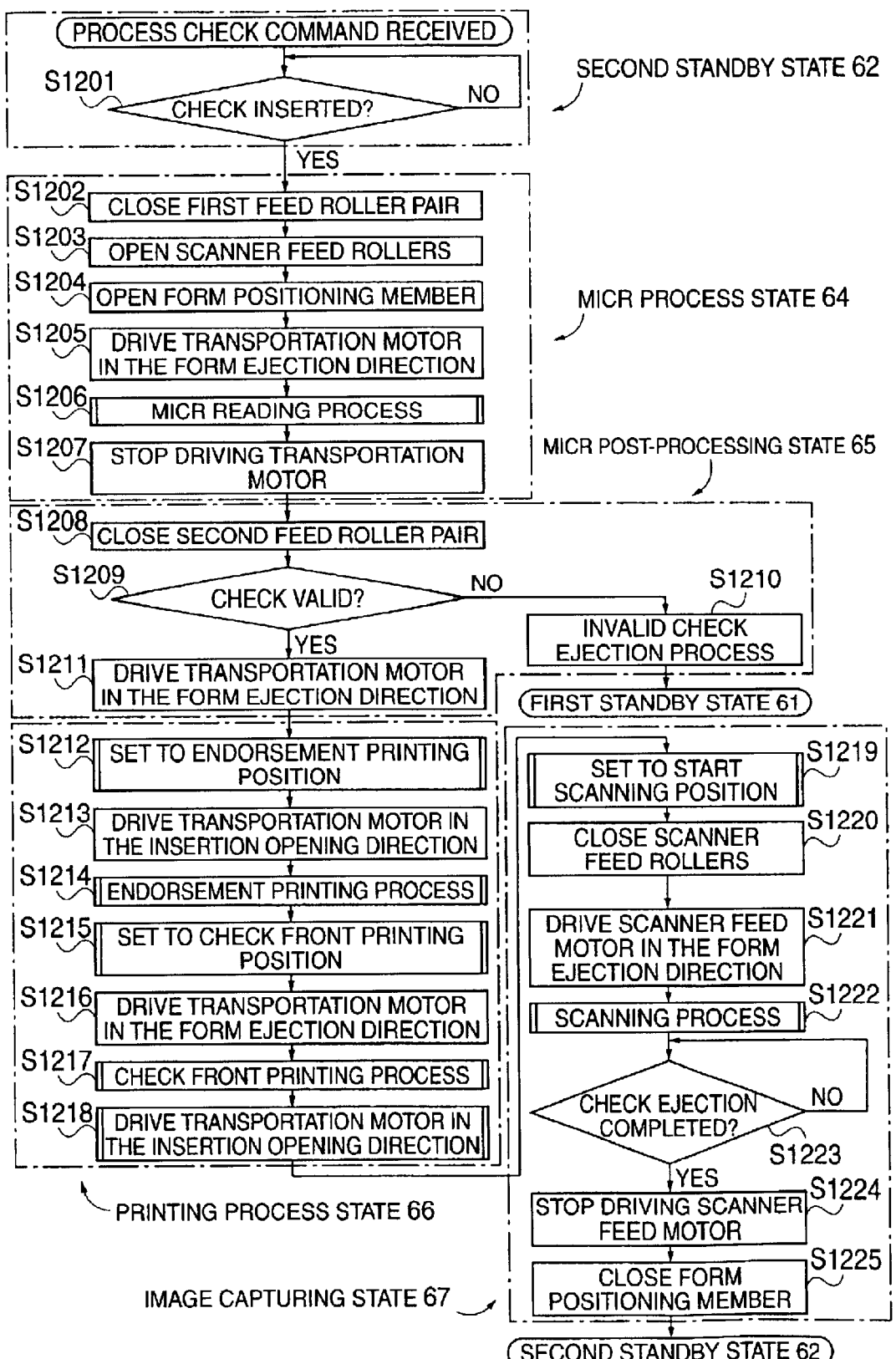
FIG. 12 is a flow chart illustrating one example of the processing operation of the check processing apparatus in FIG. 1.
Figure 13:
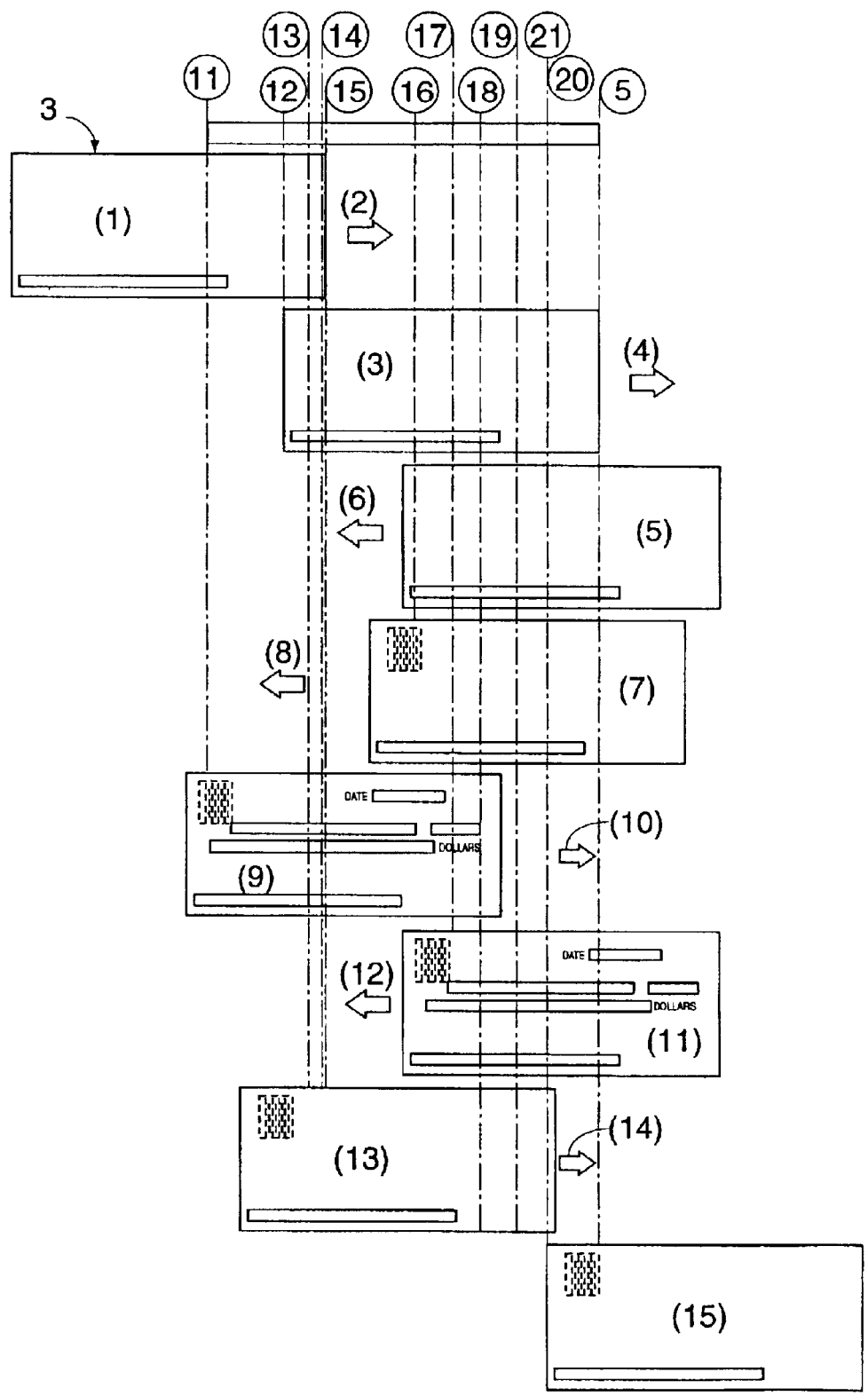
FIG. 13 shows the position of a check in the transportation path at specific times during the process shown in FIG. 12.

FIG. 12 is a flow chart of an operating process typical of the check processing apparatus 1 according to this embodiment of the invention. FIG. 13 shows the transportation position of the check 3 at various times in this operating process. FIG. 14 to FIG. 17 show the positions of various components at various times in the operating process.

In the operating mode described in this example a check processing command is received in the second standby state 62 (step S1201 in FIG. 12) and the second standby state 62 is resumed after passing through the MICR process state 64 (steps S1202 to S1207), MICR post-processing state 65 (steps S1208 to S1211), the printing process state 66 (steps S1212 to S1218), and the image capturing state 67 (steps S1219 to S1225) to read an inserted check with the MICR head 12, print to the check with print heads 16, 18, and capture an image of the check with image scanner 20.

As shown in the figures, the first step is to wait for insertion of a check 3 (S1201). During this time the first and second feed roller pairs 13, 17 are held open, and the form positioning member 15 and scanner feed rollers 21 are held closed.

Figure 14:
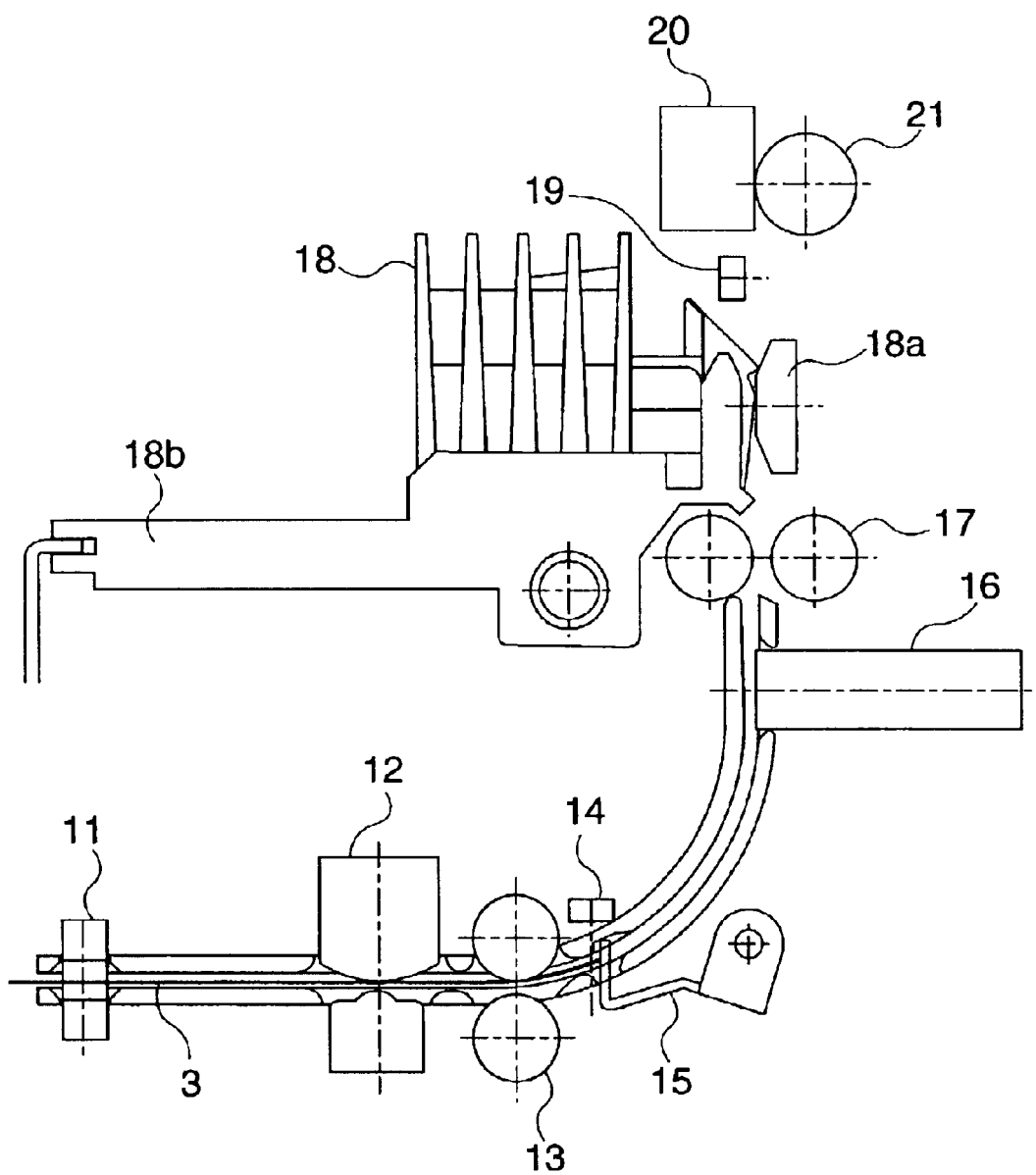
FIG. 14 shows the positions of particular parts of the check processing apparatus for processing the check during the process of FIG. 12.

When a check 3 is inserted from insertion opening 4, check insertion is detected from the detection signals output by trailing edge detector 11 and leading edge detector 14. The position of the check 3 at this time is indicated by check position (1) in FIG. 13 and the positions of the various components are as shown in FIG. 14.

Figure 15:
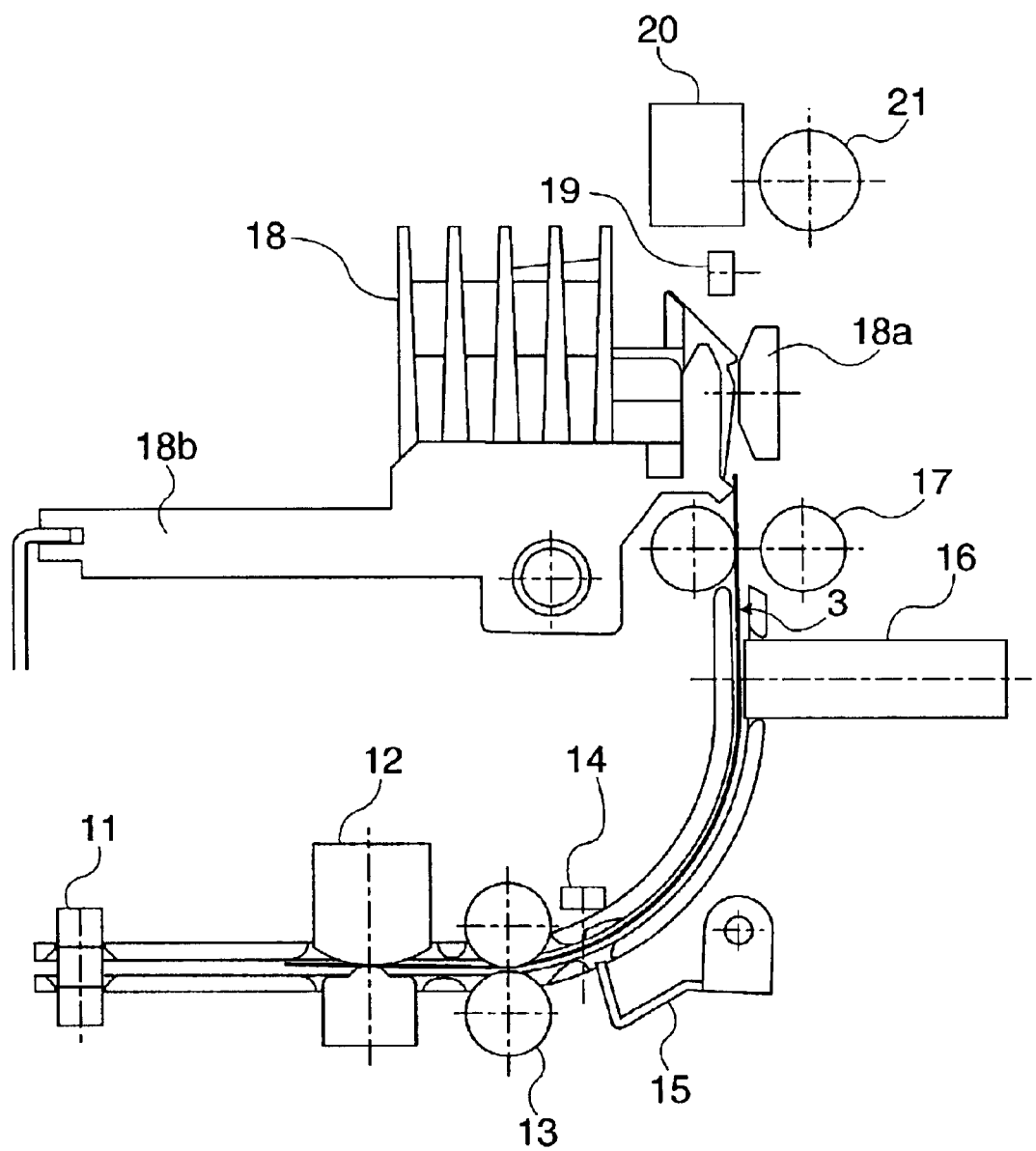
FIG. 15 shows the positions of particular parts of the check processing apparatus for processing the check during the process of FIG. 12.

When check insertion is detected the MICR process state 64 is entered and the first feed roller pair 13 are closed (step S1202), the scanner feed rollers 21 open (step S1203), and the form positioning member 15 opens (step S1204). The transportation motor 51 is then driven in the direction of the exit opening 5 (forward) (step S1205) to read the magnetic ink characters with the MICR head 12 (step S1206). The check 3 is positioned at check positions (2) and (3) in FIG. 13 at this time, and the positions of the various components are as shown in FIG. 15. Driving the transportation motor 51 stops after MICR reading ends (step S1207). The MICR post-processing state 65 is also entered at the same time with the second feed roller pair 17 closed (step S1208).

The data read by the MICR head 12 in the MICR process state 64 is sent to the host computer 58 in the MICR post-processing state 65 to determine if the check 3 is valid or not. When the check validation result is received from the host computer 58, it is determined whether or not the check is valid (step S1209). If the check 3 is invalid an invalid check ejection process (S1210) is run, the first standby state 61 is resumed, and this process ends. If the check 3 is valid, the transportation motor 51 drives in the direction of the form exit to advance the check 3 in the forward direction (step S1211).

Figure 16:
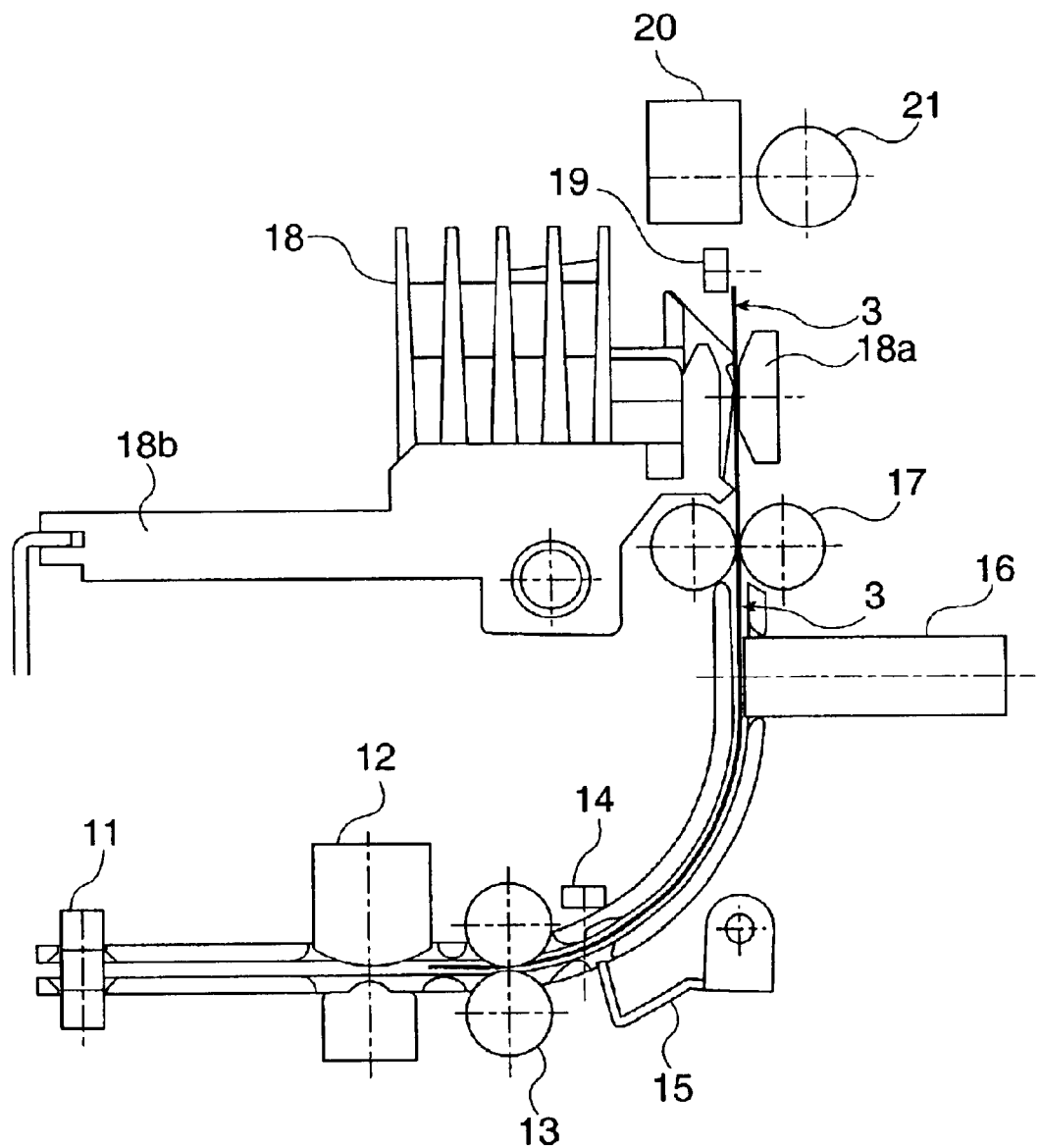
FIG. 16 shows the positions of particular parts of the check processing apparatus for processing the check during the process of FIG. 12.

The printing process state 66 is then entered and the check 3 is set to the endorsement printing position (step S1212). This check position is shown at (4) and (5) in FIG. 13, and the part positions are as shown in FIG. 16. The endorsement printing position and the various positions described below are set based on the number of transportation motor steps (including stopping transportation) from a specific reference position based on the check positions detected by detectors 11, 14, and 19. When positioning for endorsement printing is completed the transportation motor 51 is driven in reverse for endorsement printing (step S1214) using the back print head 16 while transporting the check 3 in reverse (step S1213). The position of the check at this time is indicated by (6) and (7) in FIG. 13.

When endorsement printing is completed, the check 3 is set to the front printing position (S1215) as indicated in FIG. 13 by check positions (8) and (9). The front of the check 3 is then printed using the front print head 18 (S1217) while driving the transportation motor 51 and transporting the check 3 in the forward direction (S1216). The check position at this time is indicated by (10) and (11) in FIG. 13. When the check front printing process is completed the transportation motor 51 is driven in reverse to transport the check 3 in reverse (S1218).

Figure 17:
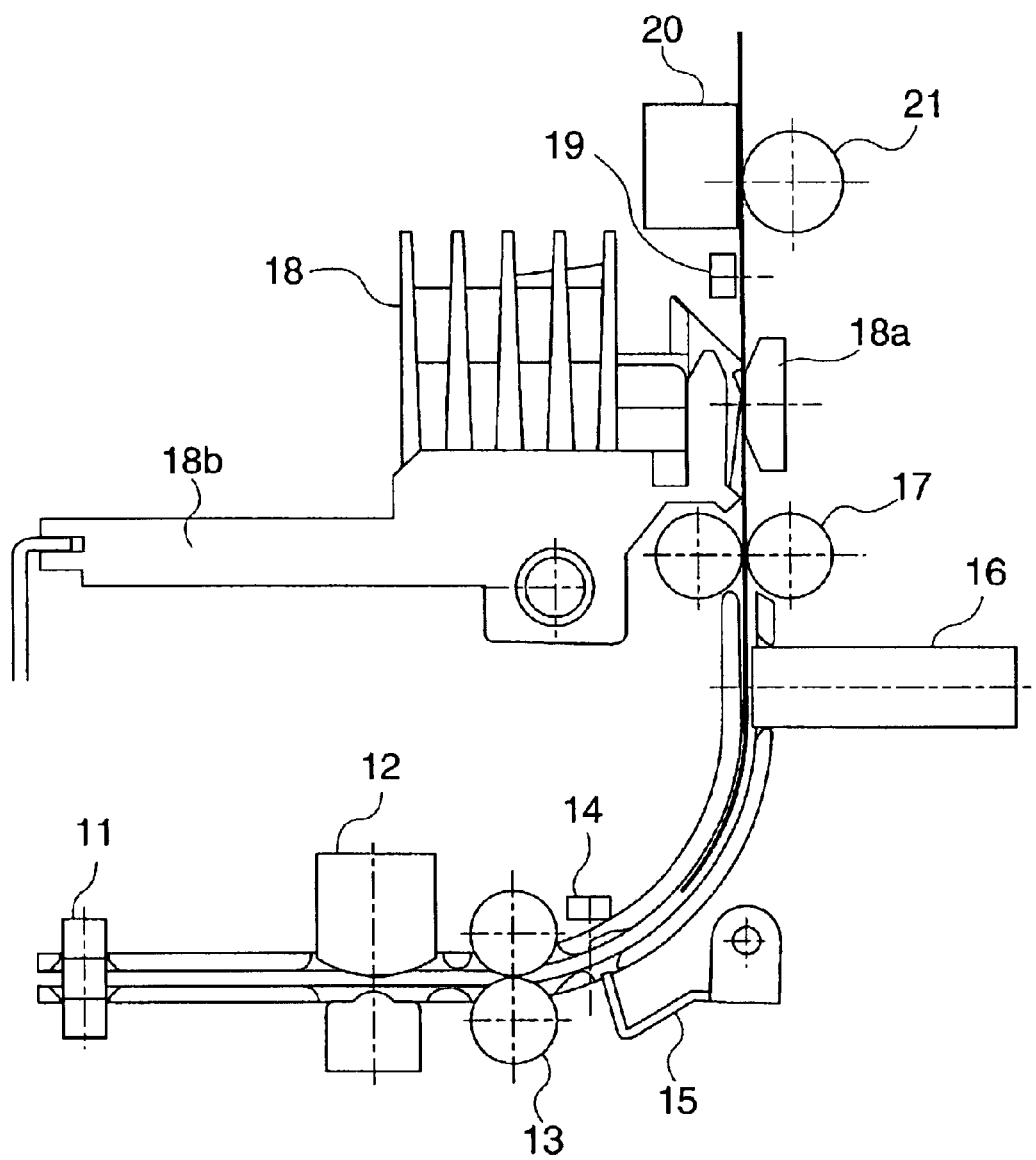
FIG. 17 shows the positions of particular parts of the check processing apparatus for processing the check during the process of FIG. 12.

The image capturing state 67 is then entered to set the check 3 to the scanning start position (S1219). The check position at this time is as indicated by (12) and (13) in FIG. 13. After the leading edge of the check 3 is positioned to the scanning start position A, the scanner feed rollers 21 are closed (S1220) and the scanning process is run (S1222) while driving the scanner feed motor 43 and transporting the check 3 in the forward direction (S1221). The check position at this time is indicated by (14) in FIG. 13 and the various components are positioned as shown in FIG. 17.

Whether or not the check 3 was ejected is then determined after the scanning process ends. If the check was ejected, driving the scanner feed motor 43 stops (S1224) with the check at position (15) in FIG. 13, and the form positioning member 15 is closed (S1225). The second standby state 62 is then resumed.

The timer 60 of control unit 50 measures the time passed since scanning ends, and the scanner feed rollers 21 are held in the closed position until the specified time T elapses. This interrupt process is described further below (see FIG. 23).

Because the scanner feed rollers 21 are not immediately opened and are held in the closed position for a specified time after scanning ends, the ejected check 3 is prevented from falling down into the vertical transportation path 8b before it can be removed by the operator.

Furthermore, because the check 3 is held at the top side of the scanner feed rollers 21 in the vertical transportation path 8b, the check 3 is also prevented from falling out of the check processing apparatus 1.

Operating Process

EXAMPLE 2

Figure 18:
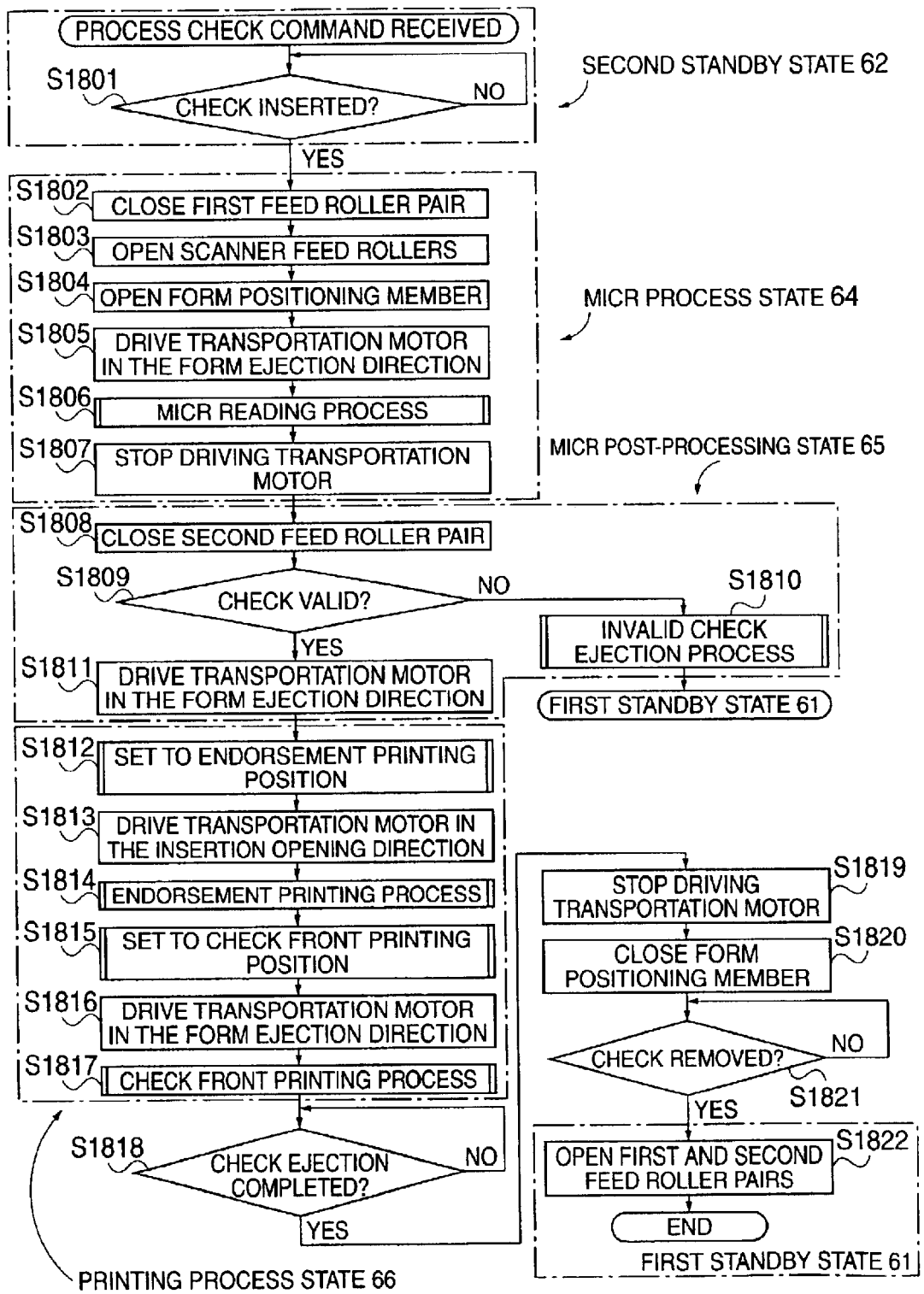
FIG. 18 is a flow chart illustrating another example of the processing operation of the check processing apparatus in FIG. 1.
Figure 19:
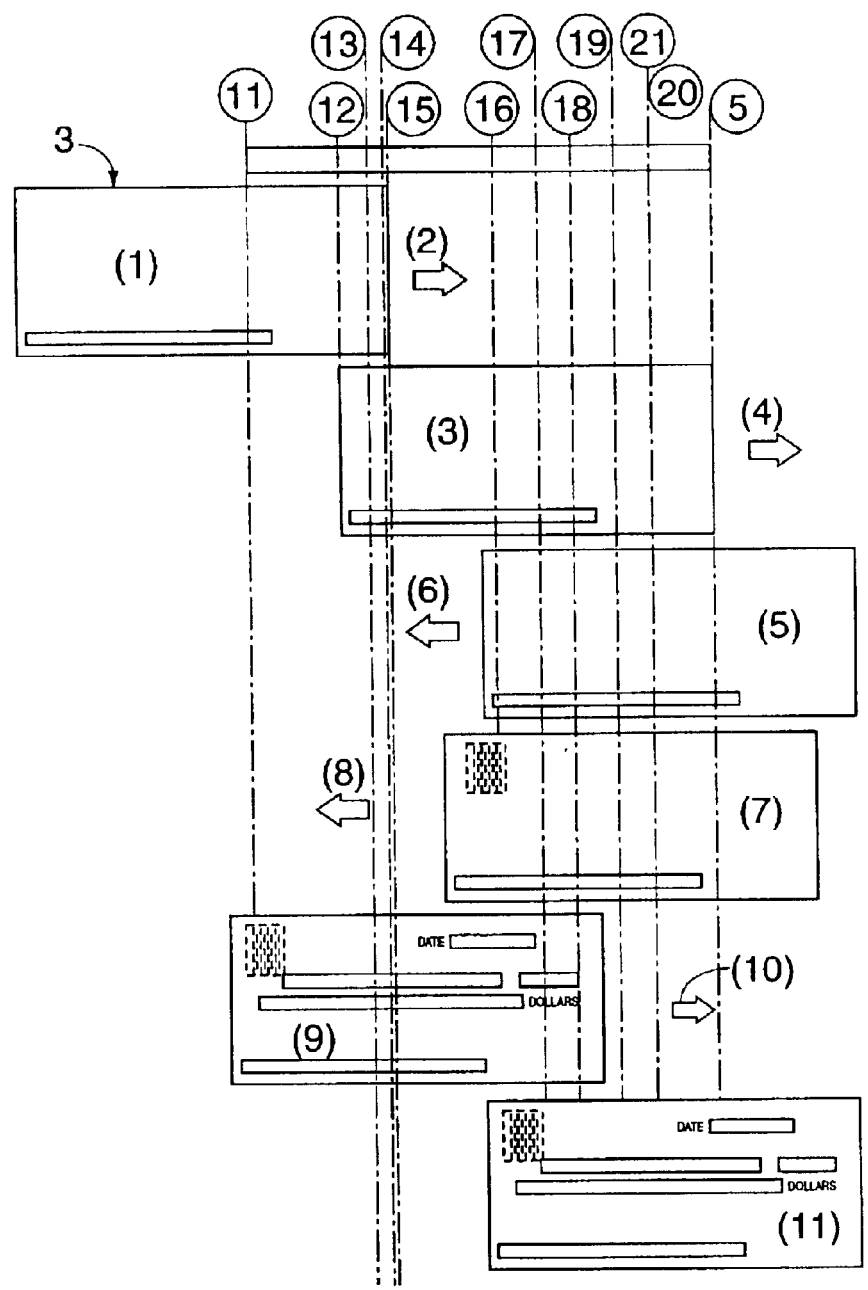
FIG. 19 shows the position of a check in the transportation path at specific times during the process shown in FIG. 18.
Figure 20:
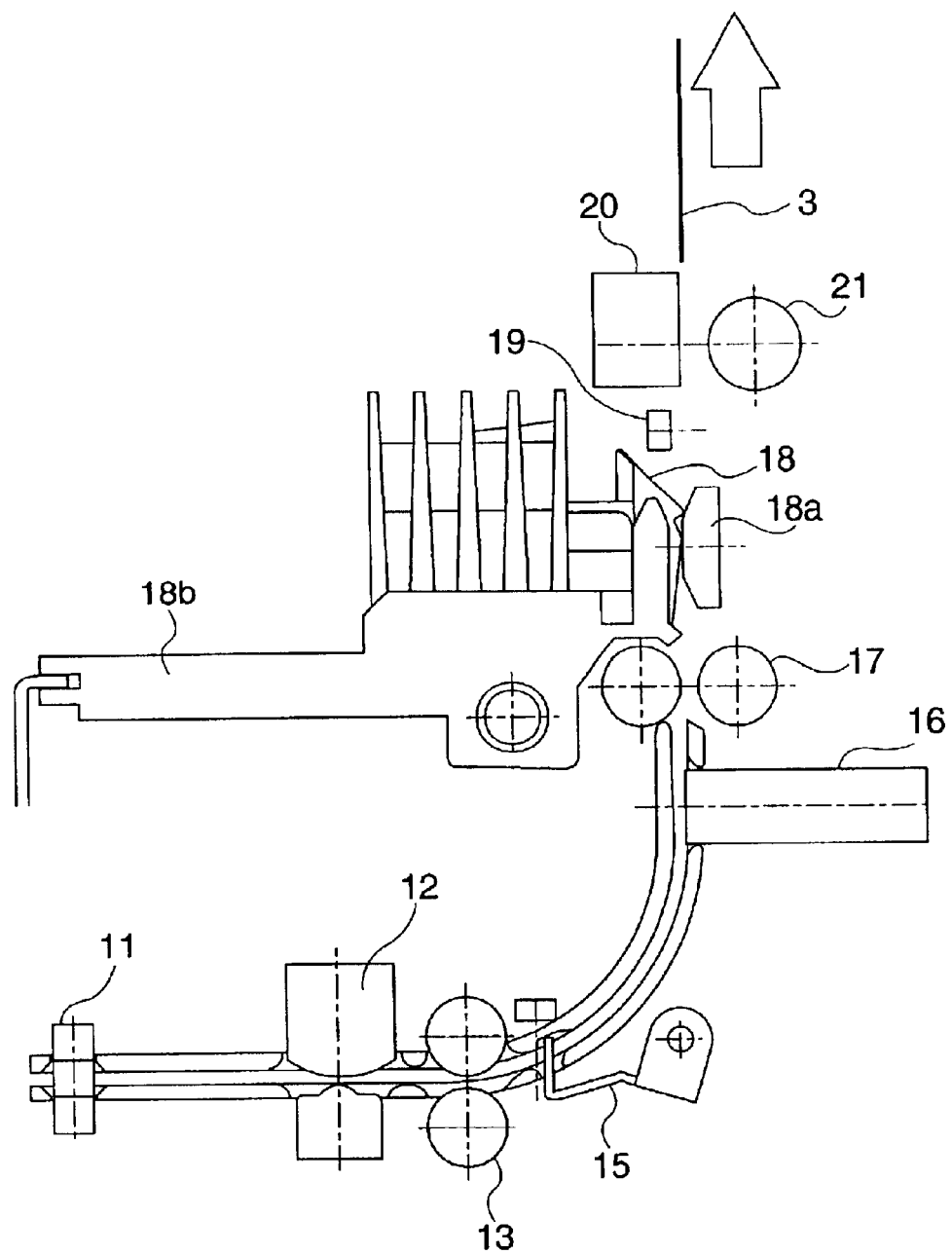
FIG. 20 shows the positions of particular parts of the check processing apparatus for processing the check during the process of FIG. 18.

FIG. 18 is a flow chart of another operating mode of the check processing apparatus 1 according to this embodiment of the invention. FIG. 19 shows the position of the check 3 at various times in this operating process. FIG. 20 shows the positions of various components when the check is ejected.

This operating mode progresses from the second standby state 62 to the MICR process state 64 (steps S1801 to S1807 in FIG. 18), to the MICR post-processing state 65 (steps S1808 to S1811), the printing process state 66 (steps S1812 to S1817), and then returns to the first standby state 61. A check processing command instructing reading the check with the MICR head and printing the check using the print head is received in the second standby state 62 in this example. Each of these states is the same as the operating modes described with reference to FIG. 12 to FIG. 17, and only the process operations that differ are described below.

More specifically, the operating mode described in this example returns directly to the first standby state 61 after the printing process state 66 instead of changing to the image capturing state 67. The scanner feed rollers 21 are also held in the open position in this operating mode. More specifically, the check 3 continues to be advanced in the forward direction after the check front printing process ends (step S1817), and whether or not the check 3 was ejected is determined (step S1818). The transportation motor 51 is stopped (step S1819) if it is detected that the check was ejected. The position of the check 3 at this time is as indicated by check position (11) in FIG. 19. The form positioning member 15 is also set to the closed position (step S1820). Removal of the check 3 is then evaluated based on a detection signal from the form ejection detector 19 (step S1821), and the first and second feed roller pairs 13, 17 are opened when it is determined that the check was removed (step S1822). The positions of various components at this time are as shown in FIG. 20. The first standby state 61 is then resumed and the process ends.

Exemplary Cut-sheet Printing Mode

Figure 21:
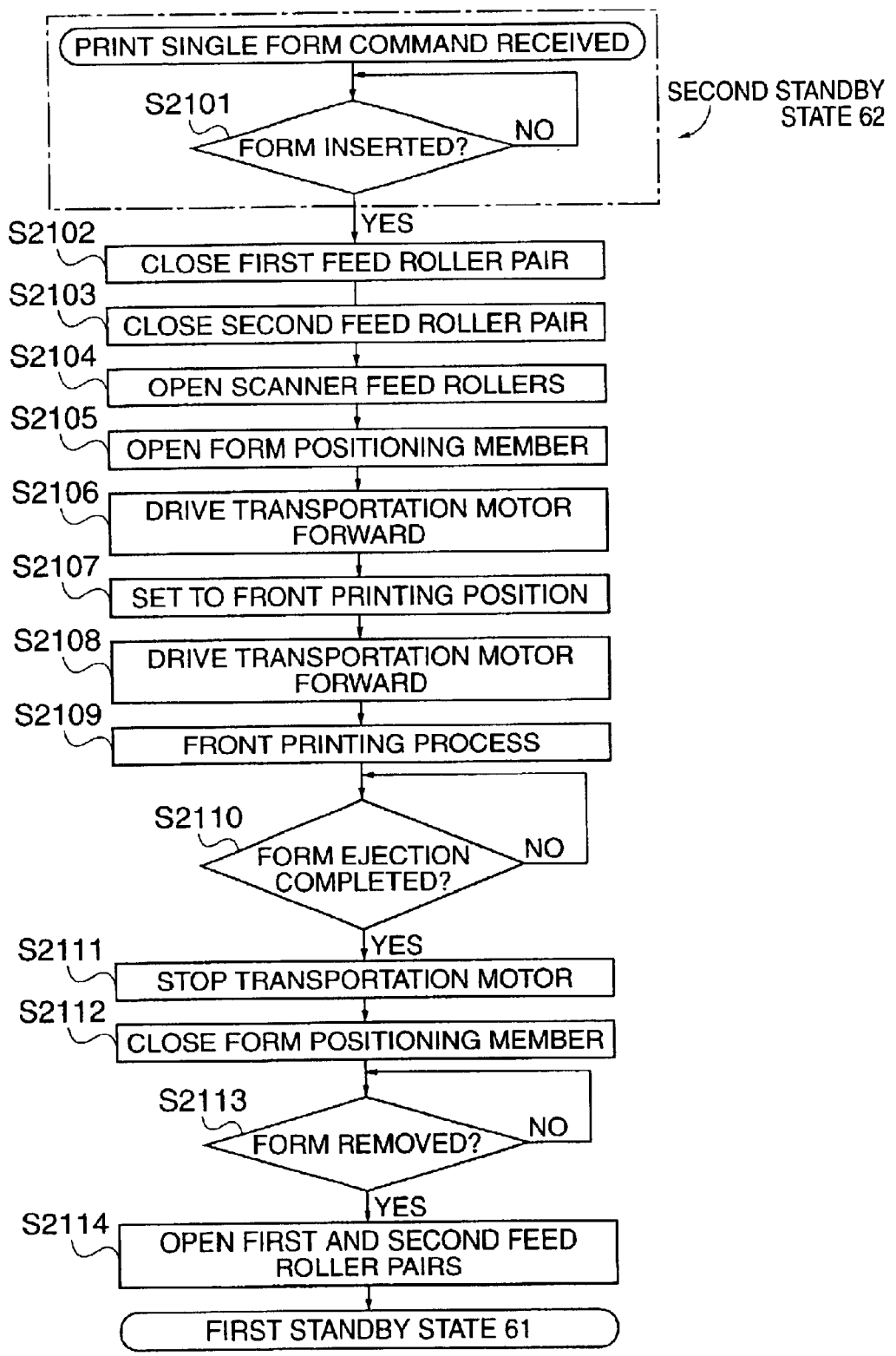
FIG. 21 is a flow chart of a form processing operation in the check processing apparatus shown in FIG. 1.

The operating modes described above refer to processing a check 3, but the check processing apparatus 1 of the present invention is not limited to processing checks 3 and can be used to print other types of cut-sheet forms. FIG. 21 is a flow chart of operation when processing such forms.

Referring to FIG. 21, when insertion of a form is detected in the second standby state 62 (step S2101), the first and second feed roller pairs 13, 17 are closed (steps S2102, S2103). Because the image scanner 20 is not used in this operating mode the scanner feed rollers 21 are moved to and then held in the open position. The form positioning member 15 is also opened (steps S2104, S2105).

The transportation motor 51 is then driven in the forward direction to carry the form forward and set (index) it to the form front printing position (steps S2106, S2107). After the form is thus positioned for printing the transportation motor 51 is driven again to carry the form forward while the form is printed using the front print head 18 (steps S2108, S2109).

After printing is completed it is determined whether form ejection is completed (step S2110). The transportation motor 51 is stopped and the form positioning member 15 returned to the closed position (steps S2111, S2112) after it is determined that form ejection is completed. When it is then detected that the form was removed (step S2113), the first and second feed roller pairs 13, 17 are opened (step S2114) and the first standby state 61 is resumed.

Transition from the Second Standby Mode to the First Standby State

The check processing apparatus 1 of the present embodiment automatically activates an interrupt process when the cover 2a is detected to be open and when the second standby state 62 continues for at least the specified time T, causing a state transition from the second standby state 62 to the first standby state 61.

Figure 22:
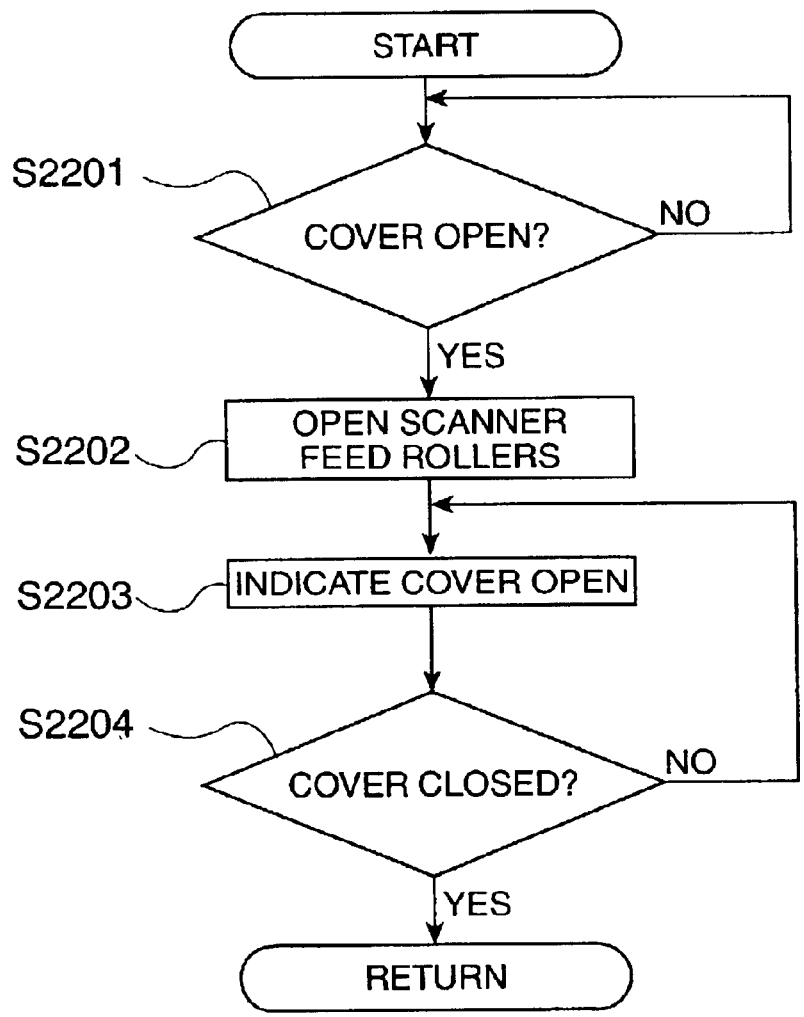
FIG. 22 is a flow chart of an interrupt process run when the releasable maintenance cover of the check processing apparatus shown in FIG. 1 is opened.

FIG. 22 is a flow chart of an interrupt process run when the cover 2a is detected open. When the openable cover 2a is detected open (step S2201) the scanner feed rollers 21 are opened and the first standby state 61 entered (step S2202), and a cover open state is indicated for the user (step S2203). When the cover 2a is then detected to have been closed, the interrupt process ends and the check processing apparatus 1 enters the first standby state 61.

Figure 23:
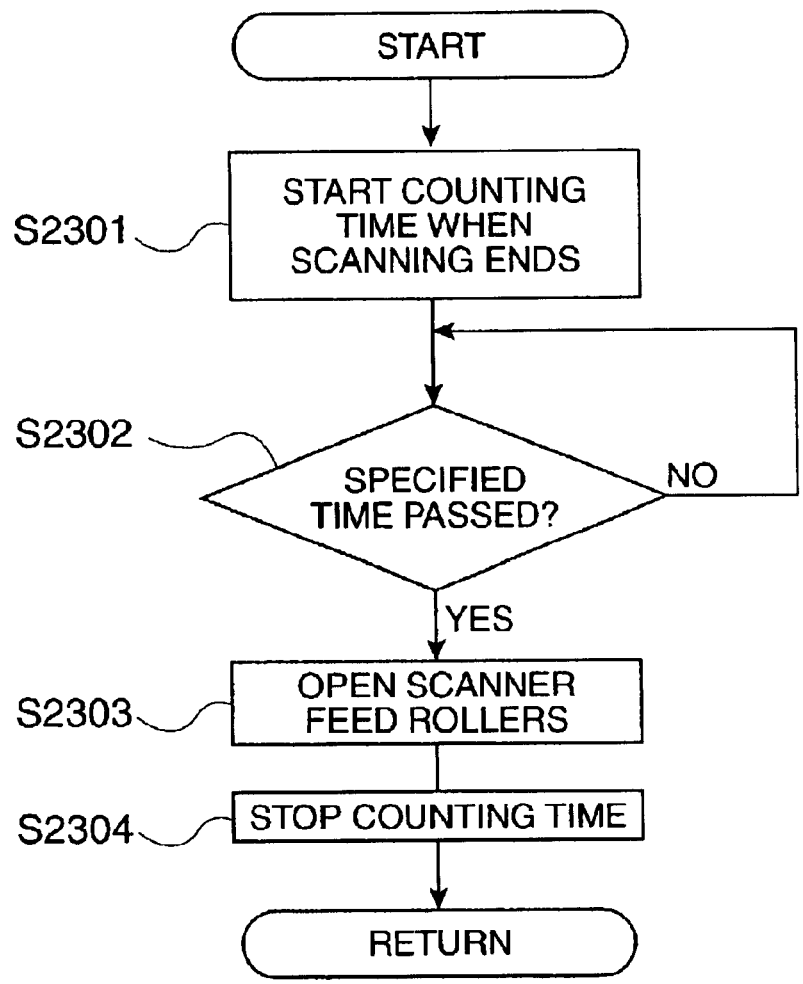
FIG. 23 is a flow chart of an interrupt process run by the check processing apparatus shown in FIG. 1 when a specific time elapses.

FIG. 23 is a flow chart of an interrupt process run when the specified time T passes. In this case the time passed since the scanning operation by the image scanner 20 ends is counted (step S2301) and the scanner feed rollers 21 are opened if the elapsed time exceeds the specified time T (steps S2302, S2303). Counting the elapsed time then stops and the timer 60 is reset (step S2304), the first standby state 61 is assumed and the interrupt process ends.

Benefits of the Present Embodiment

As described above, print heads 16 and 18 for printing on a check 3 or other form, an image scanner 20 for scanning the printed surface of the check 3, and an MICR head 12 are disposed along the transportation path 8 guiding the check 3, and scanner feed rollers 21 for pressing the check 3 to while transporting it over the image scanner 20 surface and a roller retraction mechanism 22 for retracting the rollers 21 from the image scanner 20 to open the transportation path 8 are disposed opposite the image scanner 20. Positional control of the scanner feed rollers 21 by the roller retraction mechanism 22 is handled by the control unit 50.

When scanning is not in progress the rollers 21 are retracted from the transportation path when transporting a check or form. As a result, the leading edge of the check or form will not be caught by the rollers 21 and such problems as paper jams and shifts in the form feed pitch can be prevented.

Furthermore, because the scanner feed rollers 21 are retracted to the open position when the maintenance cover 2a is opened, paper jams can be removed and regular maintenance can be performed without interference from scanner feed rollers 21 in the closed position.

Yet further, the scanner feed rollers 21 are held in the closed position for a specified time instead of opening the scanner feed rollers 21 immediately after scanning is completed. The ejected check 3 can therefore be held in the vertical transportation path 8b contiguous to the paper exit opening, and the check or form can be prevented from falling back into the check processing apparatus. Furthermore, because the ejected check or form is held in the form exit opening by the vertical transportation path 8b and scanner feed rollers 21, the parts count can be reduced and the structure simplified compared with using a dedicated holding member for holding the check or form after being ejected.

An internal shield 23 that moves in conjunction with the scanner feed rollers 21 so as to cover the transportation path between the image scanner 20 and exit opening 5 is also disposed in the present embodiment. The transportation path between the scanning position of the image scanner 20 and the exit opening 5 is thus covered by the internal shield 23 during scanning, thereby preventing incidence of external light entering from the exit opening 5 to the scanning position and thus preventing such problems as a drop in scanned image quality. When scanning is not in progress the internal shield 23 is removed to the retracted position so that smooth form transportation will not be obstructed due to contact of the transported check or form with the internal shield 23.

In addition to this internal shield 23, the check processing apparatus 1 of the present embodiment also has an external shield 24 covering the exit opening 5. External light is therefore blocked by the external shield 24 during scanning even if a folded or wrinkled check or form pushes the internal shield 23 open. Incidence of external light on the scanning position of the image scanner 20 is therefore reliably prevented. More specifically, the combined light shielding effect of the internal shield 23 and external shield 24 positively prevent incidence of external light to the scanning position.

In addition, the internal shield of the present embodiment is urged by a torsion spring or other urging means to the image scanner side during scanning, and is held to a retracted position when not scanning. The internal shield is therefore positively held in contact with the transported check during scanning, and penetration of external light can be reliably prevented. Furthermore, vibration or impact to the apparatus when not scanning will not cause the internal shield to jump into the transportation path and interfere with check transportation.

Furthermore, because the focal point A of the image scanner 20 is offset either upstream or downstream in the transportation direction from the scanner contact position B of the scanner feed rollers 21, pressure from the rollers 21 is prevented from acting directly on the focal position A of the image scanner 20. This reduces the transfer of ink to the scanner focal position A during the scanning process following printing, and can therefore suppress or prevent loss of scanned image quality due to the adhesion of such ink.

As also described above, the roller retraction mechanism 22 has a freely pivotable pressure lever 36 for advancing and retracting the roller support shaft 34 of rollers 21 relative to the image scanner 20, a torsion spring 39 urging the pressure lever 36 in the direction applying pressure to the check, a solenoid 35 for retracting the pressure lever 36 against the force of torsion spring 39, and a roller 21 drive power transfer mechanism disposed to the pressure lever 36. Therefore, by supporting the scanner feed rollers 21 with a pressure lever 36 whereby the rollers can be advanced and retracted, the roller retraction mechanism 22 can be compactly built and a smooth advance/retraction operation can be assured. Moreover, because the roller 21 drive transfer mechanism is disposed to the pressure lever 36, drive power can be reliably transferred to the rollers 21.

Yet further, because the roller retraction mechanism 22 is disposed between the pair of rollers 21 on the roller support shaft 34, the pair of rollers 21 can be substantially evenly urged, form feeding problems due to uneven pressure can e prevented, and the pair of rollers 21 can be moved in parallel when retracted to reliably open the transportation path 8.

In addition, the scanner feed rollers 21 and roller retraction mechanism 22 are configured as the scanner feed unit 30 mounted on a movable frame 28 that is pivotably disposed to a stationary frame 25, and the entire scanner feed unit 30 can be retracted from the image scanner 20. A wide space can therefore be opened between the image scanner 20 and scanner feed rollers 21 by retracting the entire scanner feed unit 30, making it simple to remove paper jams in the image scanner 20 and to clean the scanning surface 20a of the image scanner 20.

A platen 18a positioned opposite the front print head 18 is also disposed to the scanner feed unit 30. As a result a wide space is also opened between the front print head 18 and platen 18a in conjunction with retracting the scanner feed unit 30, making it easy to remove paper jams at the front print head 18.

A pair of roller members 17b forming a second feed roller pair 17 located upstream of the image scanner 20 is also disposed to the scanner feed unit 30. As a result, retracting the scanner feed unit 30 also opens a wide space between the second feed roller pair 17, making it easy to remove paper jams at the second feed roller pair 17.

Alternative Embodiments

The above preferred embodiment of the present invention is described using a check processing apparatus by way of example, but the present invention can also be applied to a print media processing apparatus having only an image scanner.

This invention can also be applied to a general-purpose multifunction printer having a scanner and not having an MICR head as does the above-described check processing apparatus.

Benefits of the Present Invention

As described above the scanner feed rollers for pressing a print medium to while transporting the print medium over the scanning surface of a scanner can be moved between a closed position where the rollers are pressed against the scanning surface and an open position retracted therefrom, and the position of the scanner feed rollers is controlled by a roller position control means in a print media processing apparatus according to the present invention. This roller position control means moves the scanner feed rollers to the closed position when the print medium reaches the scanning start position of the image scanner, thereby transporting the print medium pressed against the scanning surface and thus improving scanning quality.

When scanning is completed, the scanner feed rollers are moved to the open position after a specific time passes with the present invention. If this time is sufficient for the operator to remove the print medium from the exit opening, problems such as the print medium falling back into the transportation path from between the scanner feed rollers and image scanner after being advanced to the paper exit can be avoided. If the timing for opening the scanner feed rollers after scanning ends is thus delayed, print media advanced to the exit opening can be prevented from falling into the transportation path without providing a special sensor for detecting if the print medium was removed from the exit opening. There is, therefore, no increase in the parts count with the attendant increase in cost in order to prevent print media advanced to the exit opening from slipping back into the transportation path.

Furthermore, the scanner feed rollers are moved to the open position in the present invention when a maintenance cover disposed to the external casing is opened. Tasks performed with the cover open, such as removing paper jams and replacing the print head ink ribbon, can be completed without interference from the scanner feed rollers.

The scanner feed rollers are also held in the open position in the present invention in operating modes in which the image scanner is not used. Interference with smooth transportation of the print medium and other such problems due to the transported print medium contacting the scanner feed rollers can thus be prevented.

As also described above a print media processing apparatus according to the present invention has an insertion opening for inserting print media, an exit opening for ejecting print media, a transportation path for conducting print media from the insertion opening to the exit opening, a scanner for scanning the printed surface of print media transported along the transportation path, and a shield means for blocking external light from passing from the exit opening to the scanning position of the scanner. Because incidence of external light from the exit opening to the scanning position can thus be prevented, a drop in scanned image quality due to the incidence of external light can also be prevented.

Although various embodiments of the present invention have been described with reference to the accompanying drawings, it will be apparent to those skilled in the art based on the foregoing description that various changes and modifications may be made. The present invention is intended to embrace all such changes and modifications that fall within the spirit and scope of the appended claims.

What is claimed is:

1. A print media processing apparatus, comprising:
    an insertion opening adapted to receive a print medium;
    an exit opening through which the print medium can be ejected;
    a transportation path adapted to transport the print medium from the insertion opening to the exit opening;
    an image scanner having a scanning surface and configured to scan an image on the print medium transported along the transportation path;
    a scanner feed roller configured to transport the print medium while pressing the print medium against the scanning surface;
    an opening/closing mechanism configured to move the scanner feed roller between a closed position in which the scanner feed roller is urged toward the scanning surface so as to press the print medium against the scanning surface and an open position in which the scanner feed roller is separated from the scanning surface;
    a releasable cover; and
    a roller position controller configured to control driving of the opening/closing mechanism to control the scanner feed roller position, wherein the roller position controller is configured
        to move the scanner feed roller to the closed position when the print medium reaches a start scanning position on the transportation path and
        then, after scanning by the image scanner ends, to move the scanner feed roller to the open positions,
    the roller position controller being further configured to move the scanner feed roller to the open position when the cover is open.

2. A print media processing apparatus as described in claim 1, further comprising a detector disposed upstream of the image scanner, the detector being configured to detect the print medium transported along the transportation path;
    wherein the roller position controller is configured to determine when the print medium reaches the start scanning position based on a detection signal from the detector.

3. A print media processing apparatus as described in claim 1, further comprising an external case in which the exit opening and releasable cover are formed.

4. A print media processing apparatus as described in claim 3, further comprising a detector configured to detect if the cover is open;
    wherein the roller position controller is configured to control the open or closed state of the cover based on a detection signal from the detector.

5. A print media processing apparatus as described in claim 1, further comprising a timer configured to measure the predetermined period of time and to be reset when the scanner feed roller moves to the open position;
    wherein the roller position controller is configured to determine when the predetermined time has passed based on information provided by the timer.

6. A print media processing apparatus as described in claim 1, wherein the image scanner and scanner feed roller are disposed in opposing positions with respect to the transportation path at a position below the exit opening.

7. A print media processing apparatus as described in claim 1, wherein the roller position controller is configured to hold the scanner feed roller in the open position when the print medium is not being scanned.

8. A print media processing apparatus as described in claim 1, further comprising a magnetic head configured to read magnetic data recorded on the print medium.

9. A print media processing apparatus as described in claim 1, further comprising a print head configured to print on the print medium.

10. A print media processing apparatus as described in claim 9, further comprising a mode selector configured to alternatively select from at least three processing modes including a first processing mode for printing on, and scanning, the print medium, a second processing mode for only printing on the print medium, and a third processing mode for only scanning the print medium.

11. A print media processing apparatus as described in claim 10, wherein the mode selector includes a manually operable mode switching button.

12. A print media processing apparatus as described in claim 10, wherein the mode selector is configured to select a processing mode based on an externally-originated mode selection command input to the print media processing apparatus.

13. A print media processing apparatus as described in claim 10, wherein
the insertion opening is adapted to receive the print medium in a substantially horizontal direction;
the transportation path has a horizontal path extending from the insertion opening, a curved path extending and curving upward from the horizontal path, and a vertical path extending upwardly from the curved path to the exit opening; and
the print head and the image scanner are disposed along the vertical path, the image scanner being located closer to the exit opening than the print head.

14. A print media processing apparatus as described in claim 1, wherein the pressing member is a scanner feed roller configured to transport the print medium while pressing the print medium against the scanning surface.

15. A control method for a print media processing apparatus that includes a transportation path adapted to transport the print medium inserted through an insertion opening to an exit opening, an image scanner configured to scan an image on a print medium transported along the transportation path, a scanner feed roller configured to transport a print medium, and an opening/closing mechanism configured to move the scanner feed roller between a closed position in which the scanner feed roller is urged toward a scanner surface of the image scanner so as to press the print medium against the scanning surface and an open position in which the scanner feed roller is separated from the scanning surface, the control method comprising the steps of:
awaiting insertion of the print medium into the insertion opening, during which time the scanner feed roller is held in the open position, which is a first standby step;
transporting the print medium from the insertion opening to a scanning position, when insertion of the print medium into the insertion opening is detected and a specific command is received;
moving the scanner feed roller to the closed position after the print medium reaches the scanning position, transporting the print medium while pressing the print medium against the scanning surface, and scanning an image printed on the print medium; and
awaiting insertion of a next print medium into the insertion opening, during which time the scanner feed roller is held in the closed position, after scanning of a previous print medium ends, which is a second standby step, wherein the scanner feed roller moves to the open position when it is detected that a releasable cover is open during the second standby step.

16. A print media processing apparatus control method as described in claim 15, wherein the scanner feed roller moves to the open position and the first standby step begins after a predetermined period of time elapses, the predetermined period of time starting from a time that a previous scanning operation ends.

17. A print media processing apparatus control method as described in claim 15, wherein the releasable cover is formed in an external case of the print media processing apparatus.

18. A print media processing apparatus control method as described in claim 15, wherein the print media processing apparatus includes a print head for printing on print media, and the control method further comprises the steps of:
transporting the print medium from the insertion opening to a printing position when insertion of the print medium into the insertion opening is detected and a specific command is received; and
printing on the print medium while the scanner feed roller is held in the open position.

19. A print media processing apparatus control method as described in claim 15, wherein the print media processing apparatus further includes a magnetic head for reading magnetic data prerecorded on print media, and the control method further comprises the steps of:
transporting the print medium from the insertion opening to a magnetic data reading position, when insertion of the print medium into the insertion opening is detected and a specific command is received; and
reading the magnetic data while the scanner feed roller is held in the open position.

20. A print media processing apparatus control method as described in claim 15, wherein the pressing member is a scanner feed roller configured to transport the print medium.

21. A print media processing apparatus, comprising:
an insertion opening adapted to receive a print medium;
an exit opening through which the print medium can be ejected;
a transportation path adapted to transport the print medium from the insertion opening to the exit opening;
an image scanner configured to scan an image on the print medium transported along the transportation path; and
a shield adapted to block external light from entering through the exit opening and impinging on a scanning position relative to the image scanner, wherein the shield comprises an internal shield that is movable between an open position and a closed position and that includes a first urging member adapted to forcibly urge the internal shield toward the image scanner when the internal shield is in the closed position.

22. A print media processing apparatus as described in claim 21, wherein the internal shield, when in the closed position, blocks an ejection side of the transportation path between a scanning position and the exit opening.

23. A print media processing apparatus as described in claim 22, wherein the internal shield comprises a moving mechanism adapted to move the internal shield between the closed position and the open position.

24. A print media processing apparatus as described in claim 23, wherein the internal shield comprises a print medium guide surface having a contact surface adapted to contact the image scanner when the internal shield is in the closed position.

25. A print media processing apparatus as described in claim 24, wherein the internal shield comprises a second urging member adapted to hold the internal shield in the open position.

26. A print media processing apparatus as described in claim 25, wherein the first and second urging members form parts of a torsion spring.

27. A print media processing apparatus as described in claim 21, wherein the shield comprises an external shield adapted to block external light from entering through the exit opening.

28. A print media processing apparatus as described in claim 27, wherein the external shield is sized to enclose the exit opening.

29. A print media processing apparatus as described in claim 28, wherein the external shield has a guide surface that is inclined or curved relative to an ejection direction.

30. A print media processing apparatus as described in claim 29, wherein the external shield extends from an open edge part of the exit opening on a side opposite the image scanner.

31. A print media processing apparatus comprising:
an insertion opening adapted to receive a print medium;
an exit opening through which the print medium can be ejected;
a transportation path adapted to transport the print medium from the insertion opening to the exit opening;
an image scanner configured to scan an image on the print medium transported along the transportation path, the image scanner having a scanning surface;
a pressing member;
an opening/closing mechanism configured to move the pressing member between a closed position in which the pressing member is urged toward the scanning surface so to press the print medium against the scanning surface and an open position in which the pressing member is separated from the scanning surface; and
an internal shield movable between an open position and a closed position in which the internal shield blocks an ejection side of the transportation path between a scanning position and the exit opening, the internal shield moving between the closed position and the open position in conjunction with the pressing member.

32. A print media processing apparatus as described in claim 31, wherein the pressing member comprises a support shaft, and the opening/closing mechanism comprises
an urging member adapted to urge the pressing member support shaft in a direction in which the scanner feed roller is in the closed position, and
a solenoid configured to slide the support shaft in a direction against the urging force of the urging member so as to move the pressing member to the open position, and
wherein the internal shield moves in conjunction with the pressing member support shaft.

33. A print media processing apparatus as described in claim 32, further comprising a shield urging member adapted to selectively hold the internal shield in one of the closed position or the open position.

34. A print media processing apparatus as described in claim 33, wherein the internal shield comprises:
a main shield part adapted to contact the scanning surface when the internal shield is in the closed position;
a leg part projecting substantially perpendicularly from each end of the main shield part;
a support structure formed in each leg part for rotatably supporting the scanner feed roller shaft; and
an engaging part projecting substantially perpendicularly from the main shield part, the engaging part urged by the shield urging member at a place on a side symmetrical to the main shield part with respect to the scanner feed roller shaft.

35. A print media processing apparatus as described in claim 34, wherein the shield urging member is a torsion spring and the engaging part is positioned between the ends thereof.

36. A print media processing apparatus as described in claim 35, further comprising a print head configured to print on print media transported along the transportation path.

37. A print media processing apparatus as described in claim 31, wherein the pressing member is a scanner feed roller configured to transport the print medium.

38. A print media processing apparatus, comprising:
an insertion opening adapted to receive a print medium;
an exit opening through which the print medium can be ejected;
a transportation path adapted to transport the print medium from the insertion opening to the exit opening;
an image scanner having a scanning surface and configured to scan an image on the print medium transported along the transportation path;
a scanner feed roller configured to transport the print medium while pressing the print medium against the scanning surface;
an opening/closing mechanism configured to move the scanner feed roller between a closed position in which the scanner feed roller is urged toward the scanning surface so as to press the print medium against the scanning surface and an open position in which the scanner feed roller is separated from the scanning surface;
a releasable cover;
a roller position controller configured to control driving of the opening/closing mechanism to control the scanner feed roller position, wherein the roller position controller is configured
to move the scanner feed roller to the closed position when a first command is received and the print medium reaches a start scanning position on the transportation path, and
then, after scanning by the image scanner ends, to hold the scanner feed roller in the closed position until receiving a second command, and to move the scanner feed roller to the open position upon receipt of the second command,
the roller position controller being further configured to move the scanner feed roller to the open position when the cover is opened whether or not the second command is received.

39. A print media processing apparatus as described in claim 38, further comprising a detector disposed upstream of the image scanner, the detector being configured to detect the print medium transported along the transportation path;
wherein the roller position controller is configured to determine when the print medium reaches the start scanning position based on a detection signal from the detector.

40. A print media processing apparatus as described in claim 38, further comprising an external case in which the exit opening and releasable cover are formed.

41. A print media processing apparatus as described in claim 40, further comprising a detector configured to detect if the cover is open;
wherein the roller position controller is configured to control the open or closed state of the cover based on a detection signal from the detector.

42. A print media processing apparatus as described in claim 38, further comprising a magnetic head configured to read magnetic data recorded on the print medium and a print head configured to print on the print medium.

43. A print media processing apparatus as described in claim 42, wherein the first command is an image scanning command for scanning an image on the print medium by the image scanner, and the second command includes one of the following commands:
a successive image scanning command,
a printing command for printing on the print medium by the print head, and
a MICR command for reading magnetic data recorded on the print medium by the magnetic head.

44. A print media processing apparatus as described in claim 38, wherein the pressing member is a scanner feed roller configured to transport the print medium.

45. A print media processing apparatus, comprising:

an insertion opening adapted to receive a print medium;

an exit opening through which the print medium can be ejected;

a transportation path adapted to transport the print medium from the insertion opening to the exit opening;

an image scanner having a scanning surface and configured to scan an image on the print medium transported along the transportation path;

a scanner feed roller configured to transport the print medium while pressing the print medium against the scanning surface;

an opening/closing mechanism configured to move the scanner feed roller between a closed position in which the scanner feed roller is urged toward the scanning surface so as to press the print medium against the scanning surface and an open position in which the scanner feed roller is separated from the scanning surface;

a timer configured to measure a predetermined period of time starting from the time that scanning by the image scanner ends, and to be reset when the scanner feed roller moves to the open position; and a roller position controller configured to control driving of the opening/closing mechanism to control the scanner feed roller position;

wherein the roller position controller is configured to move the scanner feed roller to the closed position when the print medium reaches a start scanning position on the transportation path and to move the scanner feed roller to the open position when the predetermined time has passed based on information provided by the timer.

46. A print media processing apparatus as described in claim 45, wherein the pressing member is a scanner feed roller configured to transport the print medium.

47. A print media processing apparatus, comprising:

an insertion opening adapted to receive a print medium;

an exit opening through which the print medium can be ejected;

a transportation path adapted to transport the print medium from the insertion opening to the exit opening;

an image scanner having a scanning surface and configured to scan an image on the print medium transported along the transportation path;

a scanner feed roller configured to transport the print medium while pressing the print medium against the scanning surface;

an opening/closing mechanism configured to move the scanner feed roller between a closed position in which the scanner feed roller is urged toward the scanning surface so as to press the print medium against the scanning surface and an open position in which the scanner feed roller is separated from the scanning surface;

a roller position controller configured to control driving of the opening/closing mechanism to control the scanner feed roller position;

a print head configured to print on the print medium; and a mode selector configured to alternatively select from at least three processing modes including a first processing mode for printing on, and scanning, the print medium, a second processing mode for only printing on the print medium, and a third processing mode for only scanning the print medium.

48. A print media processing apparatus as described in claim 47, wherein the pressing member is a scanner feed roller configured to transport the print medium.

* * * * *

UNITED STATES PATENT AND TRADEMARK OFFICE
CERTIFICATE OF CORRECTION

PATENT NO. : 6,983,885 B2  
DATED : January 10, 2006  
INVENTOR(S) : Katsuyuki Endo et al.

It is certified that error appears in the above-identified patent and that said Letters Patent is hereby corrected as shown below:

<u>Title page,</u>  
Item [56], References Cited, FOREIGN PATENT DOCUMENTS, insert  
-- JP    10042095 A *    2/1998  
   JP    07061639 A *    3/1995  
   JP    2000094732 A *  4/2000 --.

Signed and Sealed this

Twenty-fifth Day of April, 2006

JON W. DUDAS  
*Director of the United States Patent and Trademark Office*